US012701451B2

(12) United States Patent
Huang et al.

(10) Patent No.: US 12,701,451 B2
(45) Date of Patent: Aug. 4, 2026

(54) CHANNEL STATE FEEDBACK FOR CONTROL CHANNELS

(71) Applicant: QUALCOMM Incorporated, San Diego, CA (US)

(72) Inventors: Yi Huang, San Diego, CA (US); Jing Sun, San Diego, CA (US); Gabi Sarkis, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 303 days.

(21) Appl. No.: 18/526,760

(22) Filed: Dec. 1, 2023

(65) Prior Publication Data

US 2025/0184786 A1 Jun. 5, 2025

(51) Int. Cl.
*H04W 24/10* (2009.01)
*H04W 72/20* (2023.01)

(52) U.S. Cl.
CPC ........... *H04W 24/10* (2013.01); *H04W 72/20* (2023.01)

(58) Field of Classification Search
CPC . H04W 24/10; H04W 72/0446; H04W 72/20; H04W 72/23
See application file for complete search history.

(56) References Cited

U.S. PATENT DOCUMENTS

2016/0323901 A1    11/2016  Yum et al.
2019/0141546 A1*    5/2019  Zhou ................. H04W 72/0453

2020/0059908 A1     2/2020  Joseph et al.
2020/0382191 A1    12/2020  Seo et al.
2023/0188279 A1*    6/2023  Abotabl ............... H04L 5/0055
370/329

OTHER PUBLICATIONS

International Search Report and Written Opinion—PCT/US2024/050264—ISA/EPO—Jan. 27, 2025.
LG Electronics: "Considerations On Power Saving for NR", 3GPP TSG RAN WG1 Ah-Hoc Meeting 1901, R1-1900602, 3rd Generation Partnership Project, Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 11, 2019, 5 Pages, XP051576144, pp. 1, 2, 5.

* cited by examiner

*Primary Examiner* — Sam Bhattacharya
(74) *Attorney, Agent, or Firm* — Holland & Hart LLP

(57) ABSTRACT

Methods, systems, and devices for wireless communication are described. A user equipment (UE) may receive (e.g., from a network entity) a control message indicating a configuration for reporting channel state feedback (CSF) for a control channel region. The configuration may indicate the control channel region and one or more resources for the UE to use to transmit a report indicating the CSF. The UE may monitor the control channel region for control channel transmissions. Based on the monitoring, the UE may transmit the report indicating the CSF via the one or more resources and according to the configuration. In some cases, the UE may perform channel measurements on the control channel region to obtain the CSF. The report may indicate a candidate aggregation level or a signal-to-interference-plus-noise ratio (SINR). The UE may receive subsequent control channel transmissions via the control channel region based on the report.

30 Claims, 17 Drawing Sheets

REGs 310

Unscheduled REGs 315

PDCCH Symbol 305-a   PDCCH Symbol 305-b   PDCCH Symbol 305-c

300

UE-1 REGs 320

UE-2 REGs 325

Measurement REGs 330

Unscheduled REGs 335

PDCCH Symbol 305-d   PDCCH Symbol 305-e   PDCCH Symbol 305-f

301

510

520

515

505

500

130

105

115

Network
Entity

Transceiver

1210

Antenna

1215

Communications
Manager

1220

Memory

Code

1230

1225

1240

Processor

1235

1205

1200

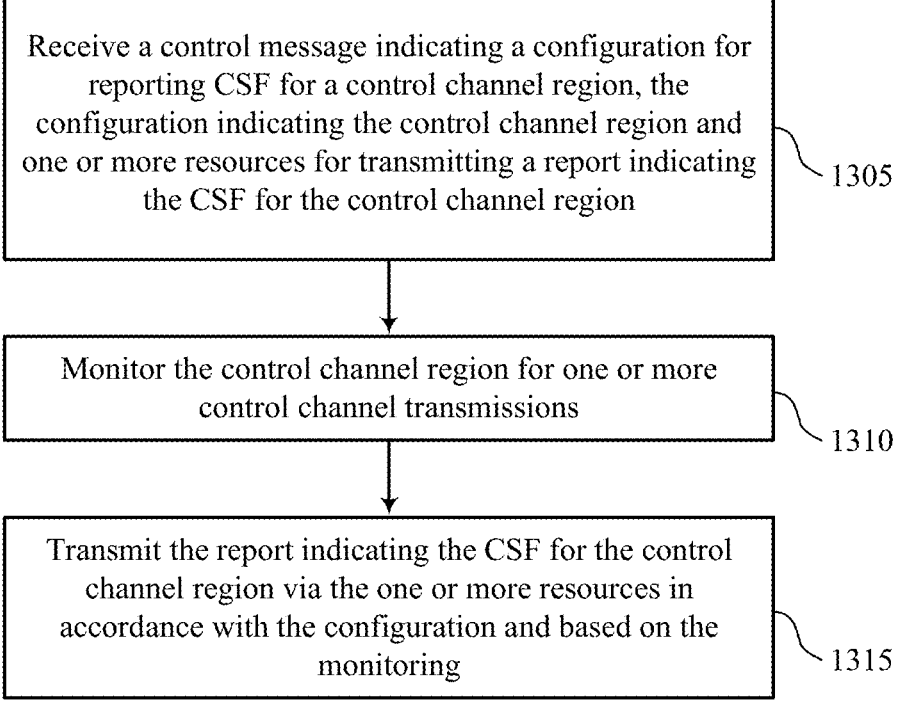

Receive a control message indicating a configuration for reporting CSF for a control channel region, the configuration indicating the control channel region and one or more resources for transmitting a report indicating the CSF for the control channel region

1305

Monitor the control channel region for one or more control channel transmissions

1310

Transmit the report indicating the CSF for the control channel region via the one or more resources in accordance with the configuration and based on the monitoring

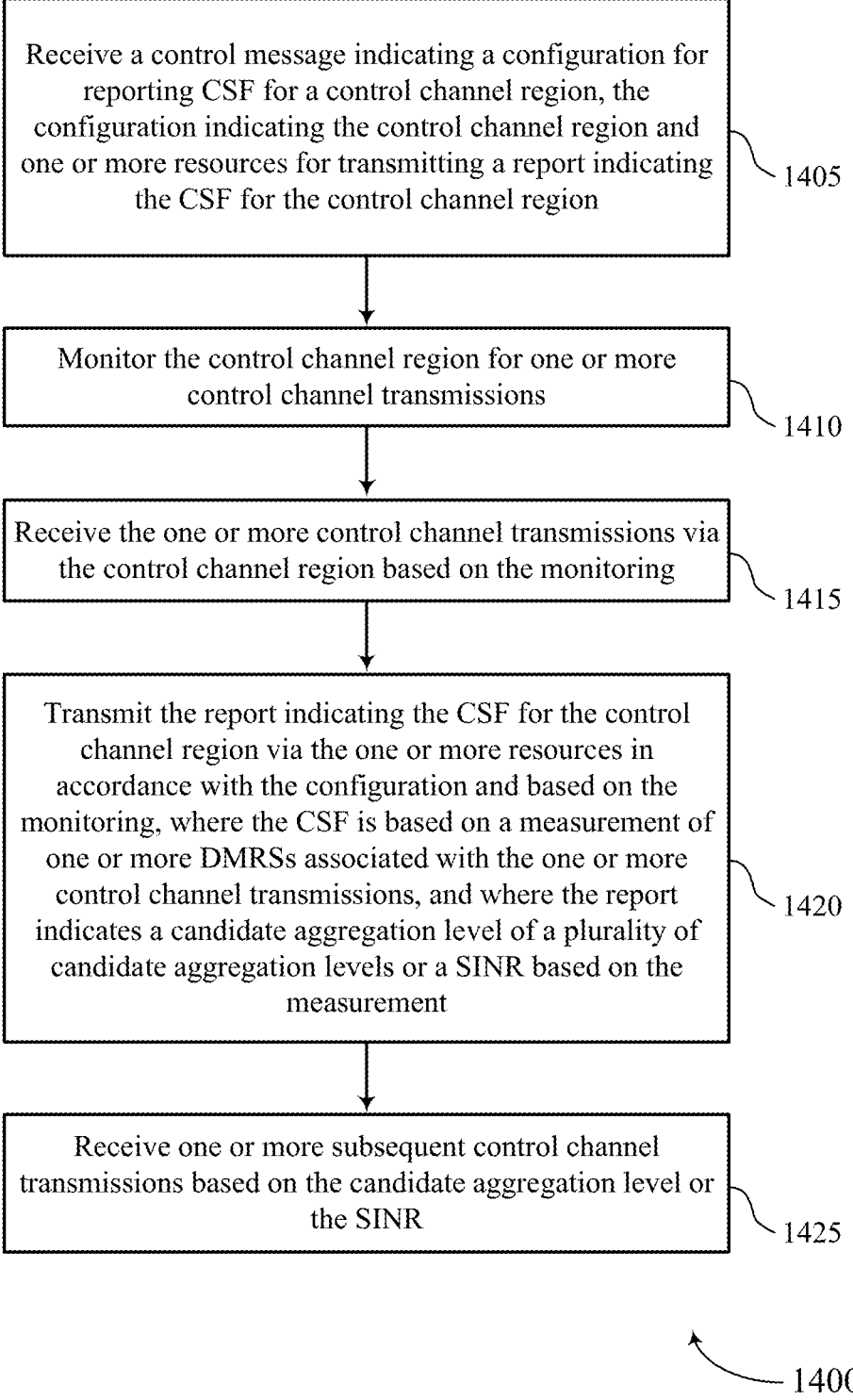

Receive a control message indicating a configuration for reporting CSF for a control channel region, the configuration indicating the control channel region and one or more resources for transmitting a report indicating the CSF for the control channel region ⟍ 1405

Monitor the control channel region for one or more control channel transmissions ⟍ 1410

Receive the one or more control channel transmissions via the control channel region based on the monitoring ⟍ 1415

Transmit the report indicating the CSF for the control channel region via the one or more resources in accordance with the configuration and based on the monitoring, where the CSF is based on a measurement of one or more DMRSs associated with the one or more control channel transmissions, and where the report indicates a candidate aggregation level of a plurality of candidate aggregation levels or a SINR based on the measurement ⟍ 1420

Receive one or more subsequent control channel transmissions based on the candidate aggregation level or the SINR ⟍ 1425

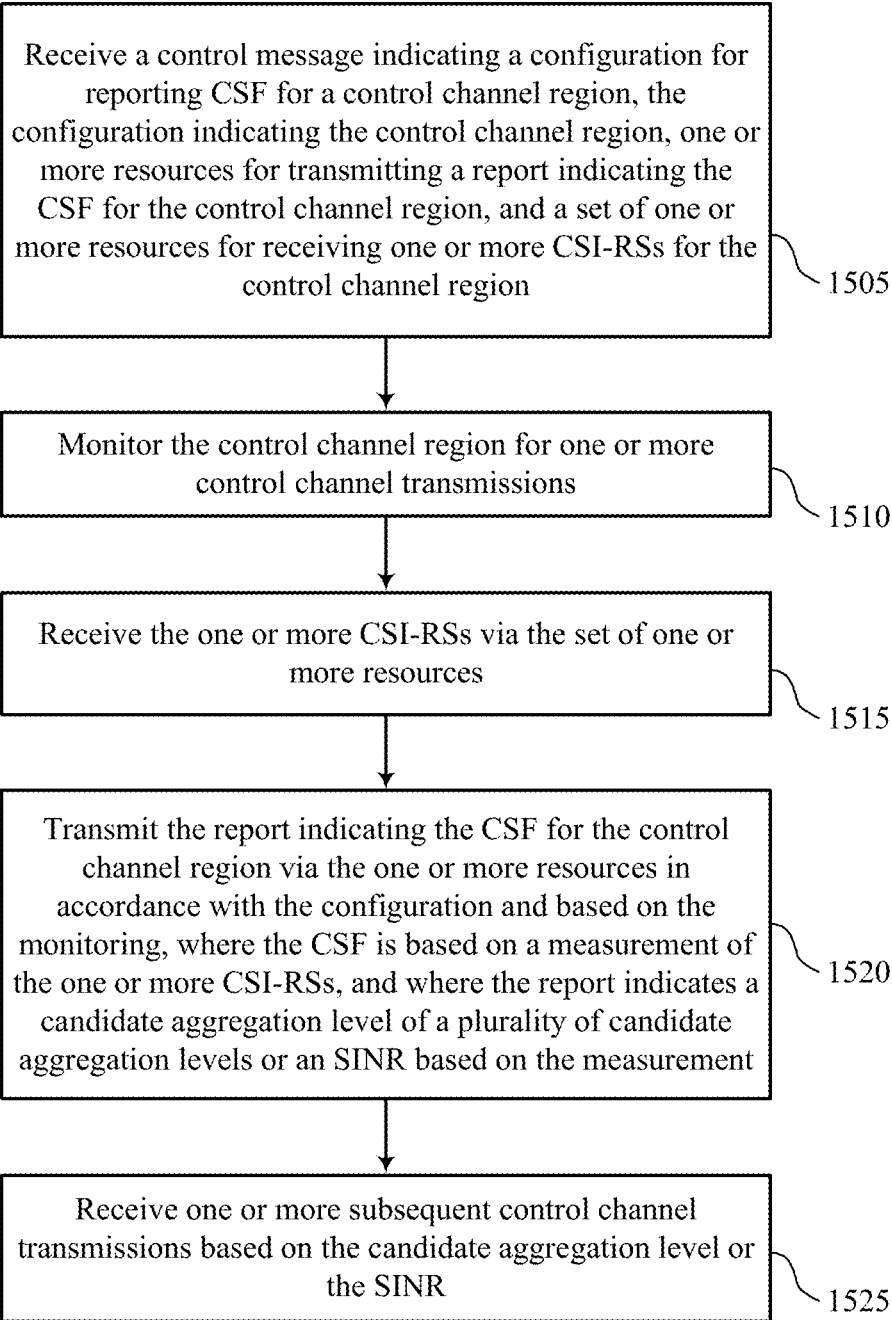

Receive a control message indicating a configuration for reporting CSF for a control channel region, the configuration indicating the control channel region, one or more resources for transmitting a report indicating the CSF for the control channel region, and a set of one or more resources for receiving one or more CSI-RSs for the control channel region

1505

Monitor the control channel region for one or more control channel transmissions

1510

Receive the one or more CSI-RSs via the set of one or more resources

1515

Transmit the report indicating the CSF for the control channel region via the one or more resources in accordance with the configuration and based on the monitoring, where the CSF is based on a measurement of the one or more CSI-RSs, and where the report indicates a candidate aggregation level of a plurality of candidate aggregation levels or an SINR based on the measurement

1520

Receive one or more subsequent control channel transmissions based on the candidate aggregation level or the SINR

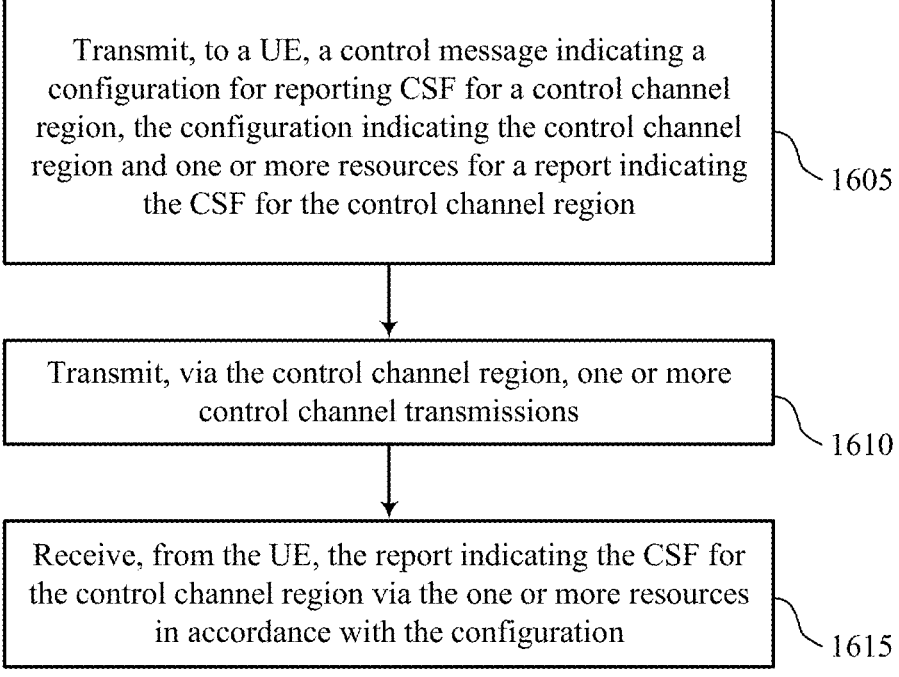

Transmit, to a UE, a control message indicating a configuration for reporting CSF for a control channel region, the configuration indicating the control channel region and one or more resources for a report indicating the CSF for the control channel region

1605

Transmit, via the control channel region, one or more control channel transmissions

1610

Receive, from the UE, the report indicating the CSF for the control channel region via the one or more resources in accordance with the configuration

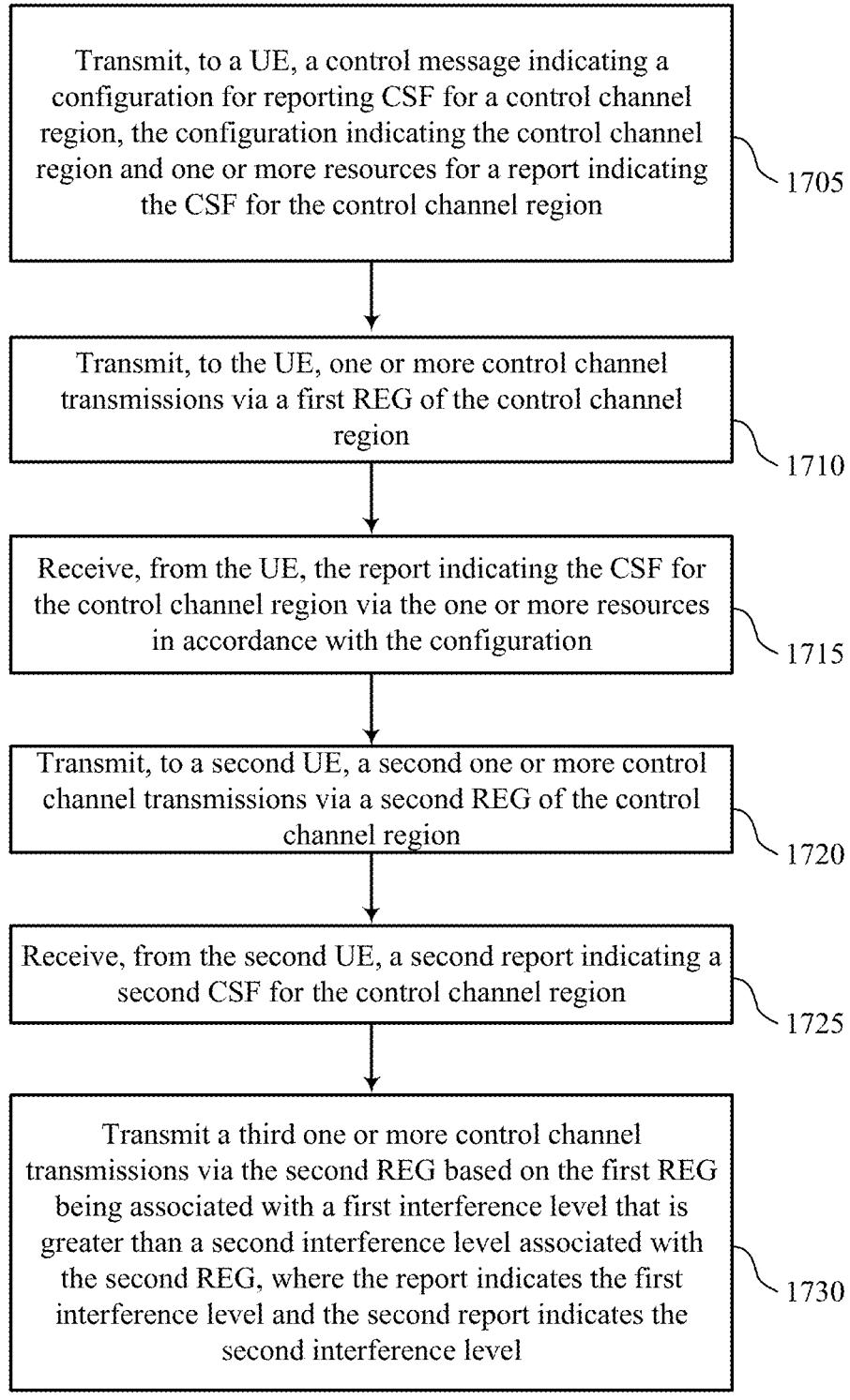

Transmit, to a UE, a control message indicating a configuration for reporting CSF for a control channel region, the configuration indicating the control channel region and one or more resources for a report indicating the CSF for the control channel region

1705

Transmit, to the UE, one or more control channel transmissions via a first REG of the control channel region

1710

Receive, from the UE, the report indicating the CSF for the control channel region via the one or more resources in accordance with the configuration

1715

Transmit, to a second UE, a second one or more control channel transmissions via a second REG of the control channel region

1720

Receive, from the second UE, a second report indicating a second CSF for the control channel region

1725

Transmit a third one or more control channel transmissions via the second REG based on the first REG being associated with a first interference level that is greater than a second interference level associated with the second REG, where the report indicates the first interference level and the second report indicates the second interference level

CHANNEL STATE FEEDBACK FOR CONTROL CHANNELS

FIELD OF TECHNOLOGY

The following relates to wireless communication, including channel state feedback (CSF) for control channels.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support channel state feedback (CSF) for control channels. Generally, aspects of the present disclosure support techniques for CSF mechanisms which enable user equipments (UEs) to perform channel estimation and report CSF for control channels, such as physical downlink control channels (PDCCHs). In particular, aspects of the present disclosure enable signaling for configuring CSF reporting mechanisms at a UE, based on which the UE may monitor a control channel region for control channel transmissions, generate one or more channel state information (CSI) parameters indicative of a state of the control channel region, and transmit a CSF report indicating the CSI parameters. The UE may receive signaling indicating a CSF reporting configuration, for instance, from a network entity.

In a first example, the UE may be configured to measure one or more reference signals (e.g., demodulation reference signals (DMRSs), CSI reference signals (CSI-RSs)) received via the control channel region to obtain the one or more CSI parameters. In a second example, the UE may determine the one or more CSI parameters based on statistics associated with reception of control channel transmissions via the control channel region. Additionally, or alternatively, the CSF reporting configuration may indicate resources of the control channel region that the UE is to measure to obtain the one or more CSI parameters, resources via which the UE is to transmit the CSF report, or both. The UE may indicate, in the CSF report, a candidate aggregation level of a set of aggregation levels, a signal-to-interference-plus-noise ratio (SINR), or a combination thereof. The network entity may transmit subsequent control channel transmissions to the UE based on the CSF report.

A method for wireless communication by a UE is described. The method may include receiving a control message indicating a configuration for reporting CSF for a control channel region, the configuration indicating the control channel region and one or more resources for transmitting a report indicating the CSF for the control channel region, monitoring the control channel region for one or more control channel transmissions, and transmitting the report indicating the CSF for the control channel region via the one or more resources in accordance with the configuration and based on the monitoring.

A UE for wireless communication is described. The UE may include one or more memories storing processor executable code, and one or more processors coupled with the one or more memories. The one or more processors may individually or collectively operable to execute the code to cause the UE to receive a control message indicating a configuration for reporting CSF for a control channel region, the configuration indicating the control channel region and one or more resources for transmitting a report indicating the CSF for the control channel region, monitor the control channel region for one or more control channel transmissions, and transmit the report indicating the CSF for the control channel region via the one or more resources in accordance with the configuration and based on the control channel region being monitored.

Another UE for wireless communication is described. The UE may include means for receiving a control message indicating a configuration for reporting CSF for a control channel region, the configuration indicating the control channel region and one or more resources for transmitting a report indicating the CSF for the control channel region, means for monitoring the control channel region for one or more control channel transmissions, and means for transmitting the report indicating the CSF for the control channel region via the one or more resources in accordance with the configuration and based on the control channel region being monitored.

A non-transitory computer-readable medium storing code for wireless communication is described. The code may include instructions executable by one or more processors to receive a control message indicating a configuration for reporting CSF for a control channel region, the configuration indicating the control channel region and one or more resources for transmitting a report indicating the CSF for the control channel region, monitor the control channel region for one or more control channel transmissions, and transmit the report indicating the CSF for the control channel region via the one or more resources in accordance with the configuration and based on the control channel region being monitored.

Some examples of the method, UEs, and non-transitory computer-readable medium described herein may further include operations, features, means, or instructions for receiving the one or more control channel transmissions via the control channel region based on the monitoring, where the CSF may be based on a measurement of one or more DMRSs associated with the one or more control channel transmissions.

In some examples of the method, UEs, and non-transitory computer-readable medium described herein, the report indicates a candidate aggregation level of a set of multiple candidate aggregation levels based on the measurement or indicates a SINR based on the measurement and the method, apparatuses, and non-transitory computer-readable medium may include further operations, features, means, or instructions for receiving one or more subsequent control channel transmissions based on the candidate aggregation level or the SINR.

Some examples of the method, UEs, and non-transitory computer-readable medium described herein may further include operations, features, means, or instructions for receiving the one or more control channel transmissions via the control channel region based on the monitoring, where the CSF may be based on one or more statistics associated with reception of the one or more control channel transmissions via the control channel region.

In some examples of the method, UEs, and non-transitory computer-readable medium described herein, the report indicates a candidate aggregation level of a set of multiple candidate aggregation levels based on the one or more statistics or indicates a SINR based on the one or more statistics and the method, apparatuses, and non-transitory computer-readable medium may include further operations, features, means, or instructions for receiving one or more subsequent control channel transmissions based on the candidate aggregation level or the SINR.

In some examples of the method, UEs, and non-transitory computer-readable medium described herein, the one or more statistics include one or more LLR statistics, a control channel decoding failure rate, or a combination thereof.

Some examples of the method, UEs, and non-transitory computer-readable medium described herein may further include operations, features, means, or instructions for receiving one or more subsequent control channel transmissions based on the report.

In some examples of the method, UEs, and non-transitory computer-readable medium described herein, the one or more control channel transmissions may be received via a first set of one or more resource element groups (REGs) of the control channel region, the first set of one or more REGs different from a second set of one or more REGs of the control channel region that may be empty and the CSF may be based on the second set of one or more REGs.

In some examples of the method, UEs, and non-transitory computer-readable medium described herein, the configuration further indicates the second set of one or more REGs.

In some examples of the method, UEs, and non-transitory computer-readable medium described herein, the configuration further indicates a set of one or more resources for receiving one or more CSI-RSs for the control channel region and the method, apparatuses, and non-transitory computer-readable medium may include further operations, features, means, or instructions for receiving the one or more CSI-RSs via the set of one or more resources, where the CSF may be based on a measurement of the one or more CSI-RSs.

In some examples of the method, UEs, and non-transitory computer-readable medium described herein, the report indicates a candidate aggregation level of a set of multiple candidate aggregation levels based on the measurement or indicates a SINR based on the measurement and the method, apparatuses, and non-transitory computer-readable medium may include further operations, features, means, or instructions for receiving one or more subsequent control channel transmissions based on the candidate aggregation level or the SINR.

In some examples of the method, UEs, and non-transitory computer-readable medium described herein, the configuration further indicates one or more CSI parameters to be included in the report, a set of one or more candidate aggregation level hypotheses associated with the CSF, a CSF scheme to be used for generating the report, or a combination thereof.

In some examples of the method, UEs, and non-transitory computer-readable medium described herein, the report indicates a candidate aggregation level of a set of multiple candidate aggregation levels associated with the one or more control channel transmissions based on the one or more control channel transmissions being unicast.

In some examples of the method, UEs, and non-transitory computer-readable medium described herein, the report indicates a SINR associated with the one or more control channel transmissions based on the one or more control channel transmissions being broadcast.

A method for wireless communication by a network entity is described. The method may include transmitting, to a UE, a control message indicating a configuration for reporting CSF for a control channel region, the configuration indicating the control channel region and one or more resources for a report indicating the CSF for the control channel region, transmitting, via the control channel region, one or more control channel transmissions, and receiving, from the UE, the report indicating the CSF for the control channel region via the one or more resources in accordance with the configuration.

A network entity for wireless communication is described. The network entity may include one or more memories storing processor executable code, and one or more processors coupled with the one or more memories. The one or more processors may individually or collectively operable to execute the code to cause the network entity to transmit, to a UE, a control message indicating a configuration for reporting CSF for a control channel region, the configuration indicating the control channel region and one or more resources for a report indicating the CSF for the control channel region, transmit, via the control channel region, one or more control channel transmissions, and receive, from the UE, the report indicating the CSF for the control channel region via the one or more resources in accordance with the configuration.

Another network entity for wireless communication is described. The network entity may include means for transmitting, to a UE, a control message indicating a configuration for reporting CSF for a control channel region, the configuration indicating the control channel region and one or more resources for a report indicating the CSF for the control channel region, means for transmitting, via the control channel region, one or more control channel transmissions, and means for receiving, from the UE, the report indicating the CSF for the control channel region via the one or more resources in accordance with the configuration.

A non-transitory computer-readable medium storing code for wireless communication is described. The code may include instructions executable by one or more processors to transmit, to a UE, a control message indicating a configuration for reporting CSF for a control channel region, the configuration indicating the control channel region and one or more resources for a report indicating the CSF for the control channel region, transmit, via the control channel region, one or more control channel transmissions, and receive, from the UE, the report indicating the CSF for the control channel region via the one or more resources in accordance with the configuration.

In some examples of the method, network entities, and non-transitory computer-readable medium described herein, the CSF may be based on a measurement of one or more DMRSs associated with the one or more control channel transmissions.

In some examples of the method, network entities, and non-transitory computer-readable medium described herein, the report indicates a candidate aggregation level of a set of multiple candidate aggregation levels based on the measurement or indicates a SINR based on the measurement and the method, apparatuses, and non-transitory computer-readable medium may include further operations, features, means, or instructions for transmitting one or more subsequent control channel transmissions based on the candidate aggregation level or the SINR.

In some examples of the method, network entities, and non-transitory computer-readable medium described herein, the CSF may be based on one or more statistics associated with reception, by the UE, of the one or more control channel transmissions via the control channel region.

In some examples of the method, network entities, and non-transitory computer-readable medium described herein, the report indicates a candidate aggregation level of a set of multiple candidate aggregation levels based on the one or more statistics or indicates a SINR based on the one or more statistics and the method, apparatuses, and non-transitory computer-readable medium may include further operations, features, means, or instructions for transmitting one or more subsequent control channel transmissions based on the candidate aggregation level or the SINR.

In some examples of the method, network entities, and non-transitory computer-readable medium described herein, the one or more statistics include one or more LLR statistics, a control channel decoding failure rate, or a combination thereof.

Some examples of the method, network entities, and non-transitory computer-readable medium described herein may further include operations, features, means, or instructions for transmitting one or more subsequent control channel transmissions based on the report.

In some examples of the method, network entities, and non-transitory computer-readable medium described herein, the one or more subsequent control channel transmissions may be transmitted in accordance with an aggregation level that may be selected based on a set of multiple reports including the report, the set of multiple reports from a set of multiple UEs including the UE.

Some examples of the method, network entities, and non-transitory computer-readable medium described herein may further include operations, features, means, or instructions for transmitting, to a second UE, a second one or more control channel transmissions via the control channel region and receiving, from the second UE, a second report indicating a second CSF for the control channel region.

In some examples of the method, network entities, and non-transitory computer-readable medium described herein, the one or more control channel transmissions may be transmitted via a first REG of the control channel region and the second one or more control channel transmissions may be transmitted via a second REG of the control channel region and the method, apparatuses, and non-transitory computer-readable medium may include further operations, features, means, or instructions for transmitting a third one or more control channel transmissions via the second REG based on the first REG being associated with a first interference level that may be greater than a second interference level associated with the second REG, where the report indicates the first interference level and the second report indicates the second interference level.

In some examples of the method, network entities, and non-transitory computer-readable medium described herein, the one or more control channel transmissions may be transmitted via a first set of one or more REGs of the control channel region, the first set of one or more REGs different from a second set of one or more REGs of the control channel region that may be empty and the CSF may be based on the second set of one or more REGs.

In some examples of the method, network entities, and non-transitory computer-readable medium described herein, the configuration further indicates the second set of one or more REGs.

In some examples of the method, network entities, and non-transitory computer-readable medium described herein, the configuration further indicates a set of one or more resources for transmitting one or more CSI-RSs for the control channel region and the method, apparatuses, and non-transitory computer-readable medium may include further operations, features, means, or instructions for transmitting the one or more CSI-RSs via the set of one or more resources, where the CSF may be based on a measurement of the one or more CSI-RSs.

In some examples of the method, network entities, and non-transitory computer-readable medium described herein, the report indicates a candidate aggregation level of a set of multiple candidate aggregation levels based on the measurement or indicates a SINR based on the measurement and the method, apparatuses, and non-transitory computer-readable medium may include further operations, features, means, or instructions for transmitting one or more subsequent control channel transmissions based on the candidate aggregation level or the SINR.

In some examples of the method, network entities, and non-transitory computer-readable medium described herein, the one or more control channel transmissions may be rate-matched around the one or more CSI-RSs.

In some examples of the method, network entities, and non-transitory computer-readable medium described herein, the configuration further indicates one or more CSI parameters to be included in the report, a set of one or more candidate aggregation level hypotheses associated with the CSF, a CSF scheme to be used for generating the report, or a combination thereof.

In some examples of the method, network entities, and non-transitory computer-readable medium described herein, the report indicates a candidate aggregation level of a set of multiple candidate aggregation levels associated with the one or more control channel transmissions based on the one or more control channel transmissions being unicast.

In some examples of the method, network entities, and non-transitory computer-readable medium described herein, the report indicates a SINR associated with the one or more control channel transmissions based on the one or more control channel transmissions being broadcast.

BRIEF DESCRIPTION OF THE DRAWINGS

FIGS. 13 through 17 show flowcharts illustrating methods that support CSF for control channels in accordance with one or more aspects of the present disclosure.

DETAILED DESCRIPTION

Figure 1:
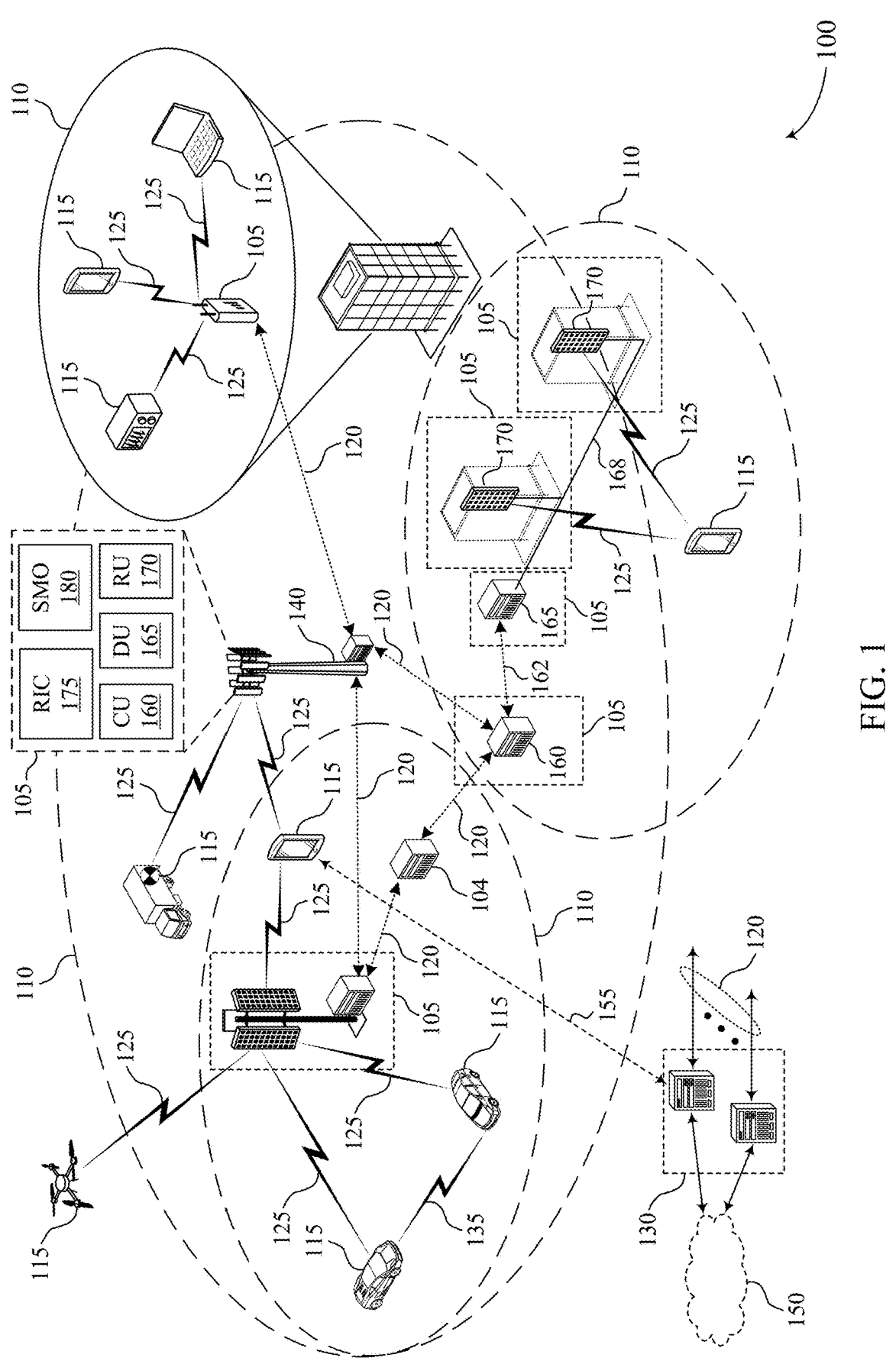
FIG. 1 shows an example of a wireless communications system that supports channel state feedback (CSF) for control channels in accordance with one or more aspects of the present disclosure.

In some wireless communications systems, a user equipment (UE) may perform channel measurements based on reference signals received from a network entity via a downlink shared channel (e.g., a physical downlink shared channel (PDSCH)), and the UE may transmit channel state feedback (CSF) to the network entity indicating the results of the channel measurements for the downlink shared channel. The network entity may utilize the CSF to efficiently schedule and configure communications with the UE via the downlink shared channel. The network entity may infer or estimate conditions associated with a downlink control channel (e.g., a physical downlink control channel (PDCCH)) based on the CSF for the downlink shared channel. However, channel conditions may not be the same for the downlink control channel and the downlink shared channel, and the CSF for the downlink shared channel may not accurately reflect a true state of the downlink control channel. For example, interference levels may be different for control channel symbols than for shared channel symbols, particularly in scenarios with relatively high Doppler. Without explicit CSF for control channels, the network entity may be unable to efficiently schedule and configure communications with the UE.

Accordingly, some implementations of the present disclosure provide techniques for closed-loop CSF for control channels, such as PDCCH. In some implementations, a UE and a network entity may support techniques for CSF mechanisms that enable the UE to perform channel estimation and report CSF for control channels. The UE may receive, from the network entity, a control message indicating a configuration for reporting CSF for a control channel region. The configuration may indicate the control channel region and one or more resources for the UE to use to transmit a report indicating the CSF. The UE may monitor the control channel region for control channel transmissions. Based on the monitoring, the UE may transmit the report indicating the CSF via the one or more resources and in accordance with the configuration.

By providing the UE with a configuration for reporting CSF for PDCCH, the network entity may improve accuracy in control channel estimation (e.g., as compared to inferred information determined by the network entity based on CSF for PDSCH). Additionally, by enabling the UE to provide the network entity with explicit CSF for PDCCH, the network entity may select or adjust PDCCH communication parameters based on the reported CSF, which may improve efficiency and reliability in subsequent PDCCH communications with the UE. Moreover, the UE may maintain PDCCH decoding statistics (e.g., PDCCH decoding failure rate, log-likelihood ratio (LLR) statistics), to enable the UE to select and report an appropriate aggregation level for subsequent control channel transmissions based on current channel conditions, to enhance reliability of the subsequent control channel transmissions.

Aspects of the disclosure are initially described in the context of wireless communications systems. Aspects of the disclosure are then discussed with reference to control channel regions and a process flow. Aspects of the disclosure are further illustrated by and described with reference to apparatus diagrams, system diagrams, and flowcharts that relate to channel state feedback for control channels.

FIG. 1 shows an example of a wireless communications system 100 that supports CSF for control channels in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support CSF for control channels as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115).

In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The wireless communications system 100 may support closed-loop CSF techniques to configure and schedule shared channel communications between network entities 105 and UEs 115. A UE 115 may perform channel measurements on reference signals received from a network entity 105 via a downlink shared channel, such as a PDSCH. The UE 115 may estimate the downlink shared channel to determine or otherwise obtain CSF based on the channel measurements. The CSF may indicate a state or condition(s) of the downlink shared channel and may include one or more CSI parameters or other feedback information. The UE 115 may transmit a report indicating the CSF to the network entity 105. For instance, the UE 115 may transmit an indication of a CQI index, precoding matric indicator (PMI), rank indicator (RI), an aggregation level, an SINR, or the like, among other examples. The network entity 105 may utilize the CSF to schedule and configure subsequent communications with the UE 115 via the PDSCH. For example, the network entity 105 may select or adjust appropriate communication parameters (e.g., based on the CSF), such as a modulation and coding scheme (MCS) and precoder, that provide improved performance, reliability, and efficiency for the subsequent communications.

Such explicit feedback mechanisms may not be supported for downlink control channels, such as PDCCH. Instead, the network entity 105 may infer CSI parameters for the PDCCH based on the CSI associated with the PDSCH. Additionally, or alternatively, the network entity 105 may infer a PDCCH decoding performance for the UE 115 based on HARQ-ACK feedback from the UE 115. The network entity 105 may use this inferred information to select or adjust a PDCCH coding rate (which may also be referred to herein as an aggregation level) and a PDCCH transmit beam for subsequent PDCCH communications with the UE 115.

However, such inferred information may not accurately reflect a true state or condition of the PDCCH. Channel conditions may change between a PDCCH symbol and a PDSCH symbol, and interference levels may not be consistent (e.g., the same) for both the PDSCH symbol and the PDCCH symbol. Thus, the inferred CSI parameters for the CSI PDCCH may be incorrect, particularly in high-Doppler scenarios where channel conditions can fluctuate rapidly. Additionally, or alternatively, the network entity 105 may not be able to distinguish a dummy NACK that is due to PDCCH decoding failure at the UE 115 from a true NACK that is due to PDSCH decoding failure at the UE 115. Here, a dummy NACK may refer to a NACK transmitted by the UE 115 to indicate that the UE 115 failed to decode the PDCCH and therefore was also unable to decode the corresponding PDSCH. From the perspective of the network entity 105, the dummy NACK and the true NACK appear to be the same, and the network entity 105 may not be able to tell whether the UE 115 failed to decode the PDSCH, the PDCCH, or both. Thus, the network entity 105 may not know whether communication parameters should be adjusted for the PDSCH, the PDCCH, or both.

Accordingly, some implementations of the present disclosure provide techniques for closed-loop CSF for control channels, such as PDCCH. Such implementations may allow the UE 115 to provide the network entity 105 with explicit CSI for PDCCH. By enabling CSF procedures and mechanisms to be performed by the UE 115 for PDCCH, the network entity 105 may be able to select or adjust appropriate PDCCH communication parameters based on more accurate information (e.g., as compared to inferred information determined by the network entity 105 based on PDSCH). Additionally, by supporting CSF reporting for PDCCH, the network entity 105 may be capable of using CSF information received from multiple UEs 115 to improve efficiency and reliability in scheduling subsequent communications with each UE 115. For example, based on respective interference levels indicated in each received CSF report, the network entity 105 may adaptively schedule PDCCH communications for each UE 115 to reduce cross-UE interference.

The UE 115 may derive CSI for the PDCCH based on signals received or a channel observed in a control channel region (e.g., one or more PDCCH OFDM symbols). The UE 115 may report the CSI to the network entity 105 as part of a CSF report for the control channel region. In some cases, the network entity 105 may transmit, to the UE 115, a control message indicating a configuration for reporting CSF for the control channel region. The configuration may indicate the control channel region (e.g., one or more control channel resources, such as time resources, frequency resources, or the like) and resources for transmitting the CSF report.

The UE 115 may derive or otherwise obtain the CSI for the PDCCH according to a feedback scheme, which may, in some cases, be indicated as part of the configuration. In a first feedback scheme, the UE 115 may be configured to determine the CSI based on scheduled control channel transmissions received via the control channel region (e.g., PDCCH transmissions scheduled for the UE 115). For instance, the UE 115 may perform channel measurements on one or more DMRSs associated with the scheduled control channel transmissions and may derive the CSI from the channel measurements. For example, the network entity 105 may send, to the UE 115, a control message indicating in which one or more time-frequency resource(s) a DMRS is transmission within or associated with the control channel region for the UE 115 to measure. Alternatively, the UE 115 may determine the CSI from historical PDCCH decoding performance statistics (e.g., statistics associated with previously-received control channel transmissions, such as LLR statistics, a PDCCH decoding failure rate, or the like). In either case, the UE may transmit the CSF report based on the CSI, where the CSF report includes an indication of a candidate aggregation level, an SINR, or the like.

In a second feedback scheme, the UE 115 may determine CSI for the PDCCH based on non-scheduled control channel transmissions (e.g., "empty" portions of the control channel region that do not include control channel transmissions for the UE 115). For instance, the UE 115 may perform channel estimation on one or more empty portions of the control channel region and may determine an interference level based on the channel estimation. The UE 115 may transmit the CSF report indicating the interference level. In a third feedback scheme, the UE 115 may be configured (e.g., by the network entity 105) to receive one or more CSI-RSs via one or more PDCCH symbols, and the UE 115 may perform channel measurements on the one or more CSI-RSs to determine the CSI for the PDCCH. The UE 115 may transmit the CSF report indicating a candidate aggregation level or an SINR based on the CSI.

Figure 2:
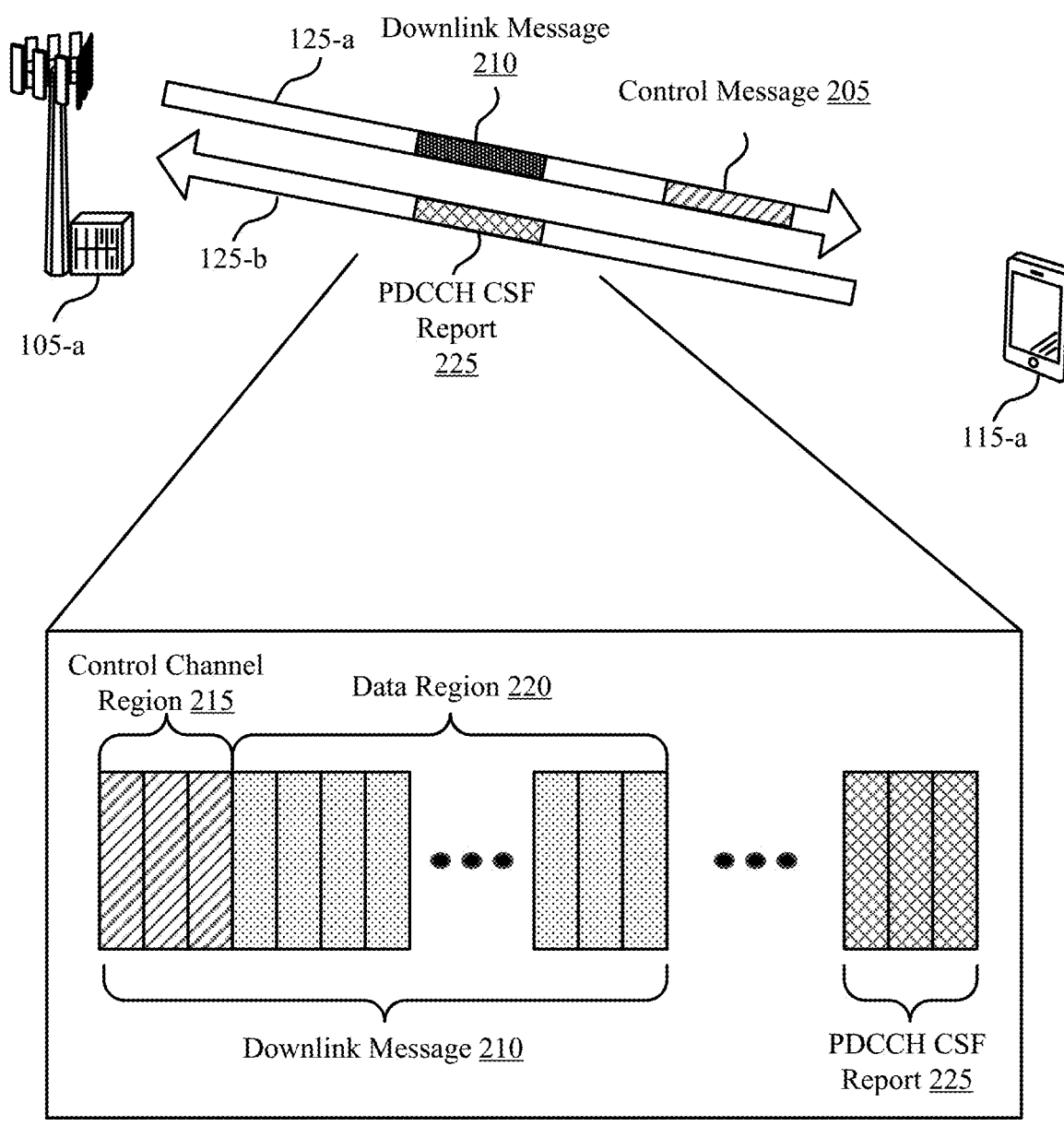
FIG. 2 shows an example of a wireless communications system that supports CSF for control channels in accordance with one or more aspects of the present disclosure.

FIG. 2 shows an example of a wireless communications system 200 that supports CSF for control channels in accordance with one or more aspects of the present disclosure. In some examples, wireless communications system 200 may implement, or be implemented by, aspects of wireless communications system 100. The wireless communications system 200 may include a network entity 105-a and a UE 115-a, which may be examples of corresponding devices as described herein.

The network entity 105-a may communicate with the UE 115-a via a communication link 125-a, which may include or be an example of a downlink communication link. The network entity 105-a may transmit downlink signals, such as downlink control signals or downlink data signals, to the UE 115-a using the communication link 125-a. Additionally, the UE 115-a may communicate with the network entity 105-a using a communication link 125-b, which may include or be an example of an uplink communication link. The UE 115-a may transmit uplink signals, such as uplink control signals or uplink data signals, to the network entity 105-a using the communication link 125-b. The communication links 125 may be examples of NR or LTE links between the UE 115-a and the network entity 105-a. In some cases, the communication links 125 may include an example of access links (e.g., Uu links).

The network entity 105-a may transmit, to the UE 115-a, a downlink message 210 via the communication link 125-a. The downlink message 210 may include a control channel region 215 (e.g., PDCCH) and a data region 220 (e.g., PDSCH), which may each include a respective set of time-frequency resources. The network entity 105-a may transmit control channel transmissions to the UE 115-a via the time-frequency resources of the control channel region 215 and may transmit data channel transmissions to the UE 115-a via the time-frequency resources of the data region 220. For example, the control channel region 215 of the downlink message 210 may include a grant (e.g., downlink control information DCI) that schedules the data region 220 of the downlink message 210.

The control channel region 215 may include or be an example of a control resource set (CORESET) that includes a set of resource blocks, where each resource block includes twelve resource elements in a frequency domain. A control channel element (CCE) includes a quantity (e.g., six) of resource element groups (REGs). A REG may include one resource block and one OFDM symbol in the time domain. In some examples, multiple REGs may be included in a REG bundle, where a REG bundle size (e.g., REG-bundle-size) is defined as a quantity of REGs in the REG bundle. An aggregation level of the control channel region 215 may indicate a quantity of CCEs that are allocated for a PDCCH.

In the example of FIG. 2, the control channel region may include three symbols (e.g., three OFDM symbols) in the time domain and a set of REGs in the frequency domain. The network entity 105-a may schedule control channel transmissions (e.g., PDCCH) to the UE 115-a on one or more REGs of the set of REGs within the control channel region 215. In some cases, the network entity 105-a may schedule control channel transmissions to other UEs 115 via other REGs of the set of REGs. To receive the control channel transmissions, the UE 115-a may monitor the control channel region 215. In some examples, the UE 115-a may perform blind decoding on the control channel region 215 and may identify the one or more REGs carrying control channel transmissions for the UE 115-a based on the blind decoding. REGs within the control channel region 215 that do not carry control channel transmissions scheduled for the UE 115-a (e.g., REGs that are used to transmit control channel transmissions to other UEs 115) may be referred to as unscheduled or empty REGs.

The wireless communications system 200 may support closed-loop CSF techniques for shared channel (e.g., PDSCH) communications between network entities 105 and UEs 115. The network entity 105-a may transmit reference signals to the UE 115-a via a PDSCH of the communication link 125-a. The UE 115-a may perform channel estimation using the reference signals (e.g., based on reference signal measurements obtained by the UE 115-a) to determine or otherwise obtain CSF for the PDSCH. The CSF may indicate a state or condition(s) of the PDSCH and may include SINR, CSI parameters (e.g., CQIs, rank indicators (RIs), precoding matrix indicators (PMIs)), and candidate communication parameters for subsequent communications (e.g., candidate aggregation levels).

The UE 115-*a* may transmit a report indicating the CSF to the network entity 105-*a*. The network entity 105-*a* may utilize the CSF to schedule and configure subsequent communications with the UE 115-*a* via the PDSCH. For example, the network entity 105-*a* may select or adjust appropriate communication parameters (e.g., based on the CSF), such as an MCS and precoder, that provide improved performance, reliability, and efficiency for the subsequent communications.

In conventional systems, such explicit feedback mechanisms may not be supported for downlink control channels, such as PDCCH. Instead, the network entity 105-*a* may infer CSI parameters for the PDCCH based on the CSF associated with the PDSCH. Additionally, or alternatively, the network entity 105-*a* may infer a PDCCH decoding performance for the UE 115-*a* based on HARQ-ACK feedback from the UE 115. The network entity 105-*a* may use this inferred information to select or adjust a PDCCH coding rate (e.g., an aggregation level, which may correspond to a quantity of REGs to use for subsequent control channel transmissions) and a PDCCH transmit beam for subsequent PDCCH communications with the UE 115-*a*.

However, such inferred information may not accurately reflect a true state or condition of the PDCCH. For example, channel conditions may change between a PDCCH symbol of a control channel region 215 and a PDSCH symbol of a data region 220. Additionally, interference levels may not be consistent (e.g., the same) for every PDCCH symbol within the control channel region 215, nor for both the PDSCH symbol and the PDCCH symbol. Additionally, or alternatively, the network entity 105-*a* may not be able to differentiate between a dummy NACK that is due to PDCCH decoding failure at the UE 115-*a* and a true NACK that is due to PDSCH decoding failure at the UE 115-*a*. Thus, inferred CSI parameters for the PDCCH may be incorrect when based on PDSCH feedback, particularly in high-Doppler scenarios where channel conditions can fluctuate rapidly.

Accordingly, aspects of the present disclosure are directed to techniques for closed-loop CSF for control channels, such as PDCCH. Aspects of the present disclosure may address multiple issues associated with conventional CSF techniques described above. As an example, the CSF mechanisms for PDCCH described herein may improve channel estimation accuracy for control channels as compared to conventional CSF techniques. By enabling the UE 115-*a* to obtain and report explicit CSI for PDCCH to the network entity 105-*a*, the network entity 105 may be able to select or adjust appropriate PDCCH communication parameters based on more accurate information (e.g., as compared to inferred information determined by the network entity 105-*a* based on PDSCH). Additionally, by supporting CSF reporting for PDCCH, the network entity 105-*a* may use CSF information received from multiple UEs 115 to improve efficiency and reliability in scheduling subsequent communications with each UE 115.

To enable CSF mechanisms for PDCCH, the network entity 105-*a* may transmit, to the UE 115-*a* via the communication link 125-*a*, a control message 205 (e.g., a radio resource control (RRC) message) that indicates a configuration for reporting CSF for the control channel region 215. The configuration may indicate the control channel region 215 (e.g., may indicate the time-frequency resources included in the control channel region 215). The configuration may further indicate one or more resources (e.g., uplink resources) for transmitting a report (e.g., the PDCCH CSF report 225) indicating the CSF for the control channel region 215. In some examples, the one or more resources may be physical uplink shared channel (PUSCH) resources and the PDCCH CSF report 225 may be transmitted via the PUSCH as uplink control information (UCI). The UE 115-*a* may monitor the control channel region 215 for one or more control channel transmissions from the network entity 105-*a*. Based on the monitoring and in accordance with the configuration, the UE 115-*a* may derive or otherwise obtain the CSF for the control channel region 215. The UE 115-*a* may transmit the PDCCH CSF report 225 indicating the CSF to the network entity 105-*a*, e.g., via the communication link 125-*b*. In some examples, the UE 115-*a* may additionally determine a best PDCCH beam for subsequent communications in the control channel region 215 based on the CSF. The UE 115-*a* may include an indication of the best PDCCH beam in the PDCCH CSF report 225.

In some implementations, the UE 115-*a* may obtain the CSF for the control channel region 215 according to a CSF scheme, which may define a measurement source (e.g., a type of resource or signal that the UE 115-*a* is to measure to determine the CSF), information to be included in the PDCCH CSF report 225, and the like. The configuration may indicate the CSF scheme that the UE 115-*a* is to use to generate the PDCCH CSF report 225. Additionally, in some examples, the configuration may indicate whether CSF reporting is enabled or disabled, one or more CSI parameters to be included in the PDCCH CSF report 225, a set of one or more candidate aggregation level hypotheses associated with the CSF, or some combination thereof.

In a first CSF scheme, the UE 115-*a* may determine CSF for the control channel region 215 (e.g., PDCCH CSI) based on scheduled control channel transmissions (e.g., PDCCH transmissions scheduled for the UE 115-*a*) received via one or more REGs within the control channel region 215. The UE 115-*a* may determine and indicate, in the PDCCH CSF report 225, a recommended (e.g., preferred) aggregation level based on receiving the control channel transmissions via the one or more REGs. For example, the UE 115-*a* may measure one or more DMRSs associated with the control channel transmissions (e.g., PDCCH DMRSs). The UE 115-*a* may perform channel estimation (e.g., PDCCH channel estimation) to derive the CSF. As another example, the UE 115-*a* may determine CSF from historical PDCCH decoding performance statistics, which may be statistics associated with previously-received control channel transmissions, such as LLR statistics, a PDCCH decoding failure rate, or the like. In either example, the CSF may include an interference level, such as an SINR value, of the one or more REGs based on the measurement(s) or the statistics. Additionally, or alternatively, the CSF may include a candidate aggregation level for the control channel region 215. Here, the UE 115-*a* may evaluate different candidate aggregation levels for the control channel region 215 based on the measurement(s) or the statistics, and may determine a candidate aggregation level based on the evaluation. In this CSF scheme, the UE 115-*a* may indicate the interference level, the candidate aggregation level, or both, in the PDCCH CSF report 225.

In a second CSF scheme, the UE 115-*a* may determine the CSF based on non-scheduled control channel transmissions (e.g., "empty" portions of the control channel region 215 that do not include control channel transmissions for the UE 115-*a*). The UE 115-*a* may perform channel estimation on one or more empty portions of the control channel region 215 and may determine an interference level (e.g., an SINR value) based on the channel estimation. In some cases, the empty portions of the control channel region 215 may correspond to one or more REGs that carry control channel transmissions for other UEs 115. Additionally, or alternatively, the empty portions of the control channel region 215 may correspond to one or more REGs that are dedicated for PDCCH interference measurements. Here, the network entity 105-*a* may configure and indicate (e.g., as part of the configuration) the one or more dedicated REGs. The UE 115-*a* may transmit the CSF report indicating the interference level.

In a third feedback scheme, the UE 115-*a* may be configured (e.g., by the network entity 105-*a*) to receive one or more CSI-RSs (e.g., one or more wideband CSI-RSs) via one or more PDCCH symbols of the control channel region 215. For example, the network entity 105-*a* may indicate, as part of the configuration, a set of resources of the control channel region 215 that are dedicated for transmission of the one or more CSI-RSs. The UE 115-*a* may receive the one or more CSI-RSs via the set of resources and may perform channel measurements on the one or more CSI-RSs to estimate an interference level associated with the control channel region 215. Based on the estimated interference level, the UE 115-*a* may evaluate multiple hypotheses for each candidate aggregation level of a set of candidate aggregation levels for the control channel region 215 to determine an optimal candidate aggregation level. In some cases, the UE 115-*a* may determine an optimal candidate aggregation level per REG or per REG group of the one or more REGs. The UE 115-*a* may transmit the PDCCH CSF report 225 indicating the optimal candidate aggregation level.

The network entity 105-*a* may receive the PDCCH CSF report 225 and may utilize the indicated CSF to select or adjust communication parameters for subsequent communications with the UE 115-*a* via the control channel region 215. For instance, the network entity 105-*a* may determine one or more REGs on which to schedule subsequent control channel transmissions. More specifically, the network entity 105-*a* may schedule the subsequent control channel transmissions on REGs that are associated with relatively low interference levels (e.g., SINR values) as compared to REGs with relatively high interference levels. Additionally, or alternatively, the network entity 105-*a* may select an aggregation level for the subsequent control channel transmissions, which may be based on the indicated interference level(s), the indicated candidate aggregation level, or both, from the PDCCH CSF report 225.

In some cases, whether the UE 115-*a* indicates, in the PDCCH CSF report 225, a candidate aggregation level or an SINR value may be dependent on a search space type associated with a search space of the control channel region 215. The search space may be a common search space, where the control channel transmissions received within the control channel region 215 may be broadcast by the network entity 105-*a* and may be received by any UE 115 including the UE 115-*a*. In such scenarios, the UE 115-*a* may indicate an SINR value in the PDCCH CSF report 225. The network entity 105-*a* may receive multiple PDCCH CSF reports 225 from multiple UEs 115, and may determine an appropriate aggregation level for subsequent broadcast control channel transmissions based on the SINR values indicated in the multiple PDCCH CSF reports 225. For instance, the network entity 105-*a* may combine the SINR values (e.g., determine an average of the SINR values) to determine an aggregation level that provides sufficient performance for all or a majority of the multiple UEs 115.

Alternatively, the search space may be a UE-specific search space used for unicast control channel transmissions to a specific UE 115. Here, the UE 115-*a* may indicate a recommended candidate aggregation level in the PDCCH CSF report 225, as the network entity 105-*a* may not be aware of the UE 115-*a*'s capability to decode a control channel transmission at a given SINR value. That is, some UEs may be capable of decoding a control channel transmission associated with a lower SINR value than other UEs, but the network entity 105-*a* may be unaware of such capabilities. As such, the network entity 105-*a* may not be able to convert an indicated SINR value to an appropriate aggregation level for the UE 115-*a*. In such scenarios, the network entity 105-*a* may use the indicated recommended aggregation level from the PDCCH CSF report 225 for subsequent control channel transmissions to the UE 115-*a*.

Figure 3A:
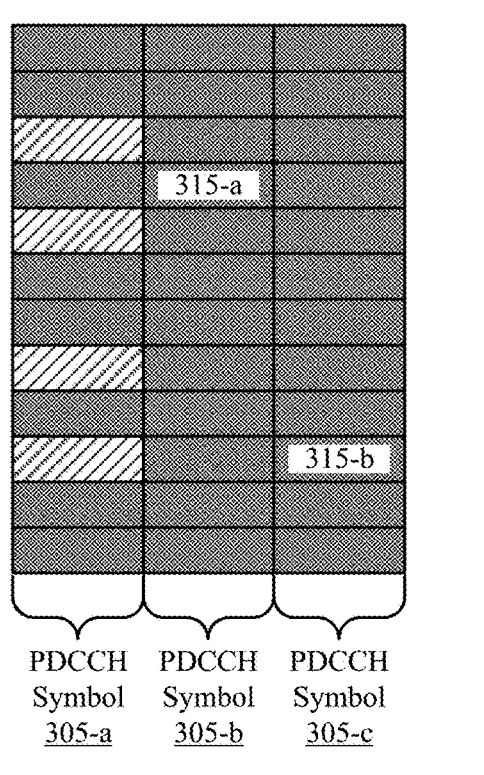
FIGS. 3A and 3B show examples of control channel regions that support CSF for control channels in accordance with one or more aspects of the present disclosure.
Figure 3A:
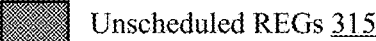
Figure 3B:
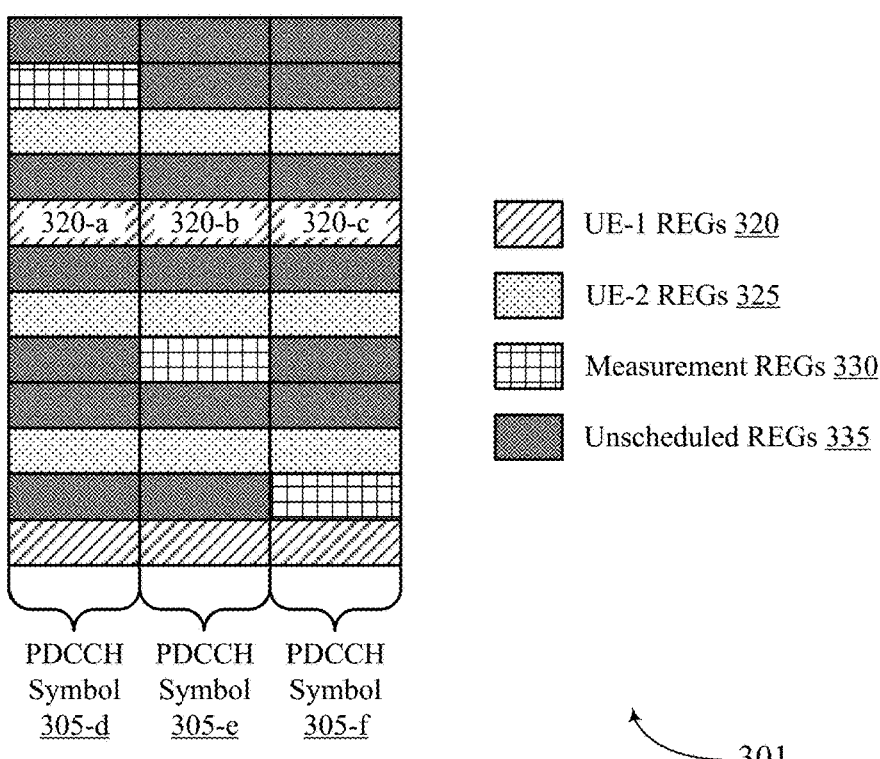

FIGS. 3A and 3B show examples of control channel regions 300 and 301, respectively, that support CSF for control channels in accordance with one or more aspects of the present disclosure. The control channel regions 300 and 301 may implement or be implemented by aspects of wireless communications system 100, the wireless communications system 200, or both. For example, the control channel regions 300 and 301 may include or be an example of a control channel, such as PDCCH, and may be used as part of a CSF scheme between a network entity 105 and a UE 115 as described herein.

A control channel region may refer to a set of resources (e.g., time resources and frequency resources) used for communicating control signaling (e.g., control channel transmissions, PDCCH transmissions). In the example of FIG. 3A, the control channel region 300 includes three PDCCH symbols 305 (e.g., a PDCCH symbol 305-*a*, a PDCCH symbol 305-*b*, a PDCCH symbol 305-*c*) in the time domain and a set of REGs (e.g., REGs 310, unscheduled REGs 315) in the frequency domain. The PDCCH symbols 305 may include or be examples of PDCCH OFDM symbols. A network entity may use the control channel region 300 to convey control signaling to all UEs in a serving cell served by the network entity, but may configure respective subsets of resources of the control channel region for UE-specific transmissions to each UE. For example, the network entity may schedule one or more control channel transmissions to a UE via one or more REGs 310 of the REGs 310. The control channel region 300 further includes unscheduled REGs 315, which may be scheduled with control channel transmissions to other UEs. From the perspective of the UE, these unscheduled REGs 315 appear empty (e.g., contain no control channel transmissions), and therefore may be referred to as empty REGs.

The network entity may transmit a control message to the UE indicating a configuration for reporting CSF for the control channel region 300. The configuration may indicate the control channel region 300 (e.g., the PDCCH symbols 305, the REGs 310, and the unscheduled REGs 315), the REGs 310 (e.g., scheduled for the UE), or both. The configuration may further indicate one or more resources (e.g., PUSCH resources) for the UE to use to transmit a CSF report indicating CSF for the control channel region 300 (e.g., PDCCH CSI). In some cases, the configuration may additionally indicate whether CSF reporting is enabled or disabled, one or more CSI parameters to be included in the CSF report, a set of candidate aggregation level hypotheses associated with the CSF, a CSF scheme to be used by the UE to generate the CSF report, one or more resources of the control channel region 300 that are allocated for CSI-RSs to be transmitted by the network entity, one or more REGs of the control channel region 300 that are allocated for performing interference measurements, or some combination thereof.

Based on the configuration, the UE may monitor the control channel region 300 for one or more control channel transmissions from the network entity. For example, the UE may blindly decode the control channel region 300 and may detect and receive one or more control channel transmissions intended for the UE on one or more REGs 310. The UE may perform channel estimation (e.g., by performing one or more channel measurements of the control channel region 300) to derive CSI for the CSF report. In some examples, the UE may derive the CSI according to a CSF scheme, which may be indicated in the configuration. A CSF scheme may indicate a measurement source, e.g., a type of resource or signal that the UE 115 is to measure to determine the CSF, such as the REGs 310, the unscheduled REGs 315, the one or more CSI-RSs, one or more REGs (e.g., of the unscheduled REGs 315) dedicated for channel measurements, one or more DMRSs associated with the one or more control channel transmissions, or some combination thereof. Additionally, the CSF scheme may indicate information to be included in the CSF report.

For example, in a first CSF scheme, the UE may obtain CSI (e.g., PDCCH CSI) including a recommended aggregation level based on scheduled control channel transmissions (e.g., scheduled PDCCH) to the UE. Here, the UE may receive the control channel transmissions via the REGs 310, e.g., based on monitoring the control channel region 300. The UE may perform measurements on one or more DMRSs (e.g., PDCCH DMRSs) associated with (e.g., transmitted as part of) the control channel transmissions. Based on the measurements and the one or more DMRSs, the UE may estimate the control channel and an interference level (e.g., an SINR value) associated with the REGs 310. In some examples, the UE may measure a respective DMRS for each REG 310 and may obtain a respective control channel estimate and SINR value for each REG 310.

The UE may use the estimation(s) and the interference level(s) to test one or more candidate aggregation level hypotheses on the REGs 310. A candidate aggregation level hypothesis may correspond to a quantity of REGs 310 via which the UE receives a control channel transmission and an associated PDCCH decoding performance. In some cases, the one or more candidate aggregation level hypotheses may be from the set of candidate aggregation level hypotheses associated with the CSF indicated in the configuration. The UE may test the candidate aggregation level hypotheses by evaluating a respective PDCCH decoding performance for a corresponding quantity of REGs 310. For instance, in a first candidate aggregation level hypothesis, the UE may evaluate a PDCCH decoding performance associated with receiving the control channel transmissions via two REGs 310. In a second candidate aggregation level hypothesis, the UE may evaluate a PDCCH decoding performance associated with receiving the control channel transmissions via eight REGs 310. The UE may select a candidate aggregation level (e.g., a quantity of REGs 310) that corresponds to an appropriate PDCCH decoding performance estimated by the hypotheses. In the CSF report, the UE may indicate the selected candidate aggregation level, the estimated interference level(s), or both, for scheduling future control channel transmissions on the REGs 310.

Additionally, or alternatively, the measurement source may be the control channel transmissions received via the REGs 310 and one or more previously-received control channel transmissions. Put another way, the UE may obtain the CSI based on past PDCCH decoding statistics and performance(s) for previously-scheduled REGs 310. The UE may calculate or otherwise determine PDCCH decoding statistics (e.g., a PDCCH decoding failure rate, LLR statistics) associated with previous receptions of control channel transmissions via the control channel region 300. In this example, the UE may derive an SINR value, a recommended aggregation level, or both, based on the PDCCH decoding statistics, and may indicate the SINR value, the recommended aggregation level, or both, in the CSF report. In some cases, the UE may additionally derive a best PDCCH beam based on the PDCCH decoding statistics and may include an indication of the PDCCH beam in the CSF report. The network entity may determine or adjust one or more communication parameters for subsequent control channel transmissions to the UE based on the CSF report. For instance, the network entity may select an aggregation level for the subsequent control channel transmissions, where the aggregation level may be the same as the recommended aggregation level indicated by the UE, or may be based on the SINR level indicated by the UE.

In a second CSF scheme, the measurement source may include one or more unscheduled REGs 315, and the UE may measure and report a PDCCH interference level based on the one or more unscheduled REGs 315. While the unscheduled REGs 315 appear empty to the UE, the unscheduled REGs 315 may be used to transmit control channel transmissions to other UEs, such that the UE may be able to detect some amount of energy on the unscheduled REGs 315. This energy may interfere with the UE's ability to successfully decode control channel transmissions via the REGs 310. Thus, the UE may perform channel estimation or energy detection on the unscheduled REGs 315 to derive an interference level associated with the unscheduled REGs 315. In some examples, the UE may perform the channel estimation or energy detection during blind decoding of the control channel region 300 (e.g., during a PDCCH blind detection procedure). The UE may indicate the interference level in the CSF report, and may also indicate a corresponding bandwidth of the control region.

In some implementations, the UE may derive and indicate, in the CSF report, a respective interference level for each unscheduled REG 315 of the unscheduled REGs 315. In some cases, the network entity may consider multiple CSF reports when scheduling subsequent control channel transmissions to a UE. For instance, the network entity may determine, based on the CSF report received from the UE, that an unscheduled REG 315-a of the unscheduled REGs 315 is associated with a first interference level. The network entity may determine, based on a second CSF report received from a second UE, that an unscheduled REG 315-b of the unscheduled REGs 315 is associated with a second interference level that is less than the first interference level. Thus, the network entity may schedule a subsequent control channel transmission to the UE on the unscheduled REG 315-b, which may reduce interference experienced by the second UE, e.g., as compared to control channel transmission scheduled on the first REG.

In some examples, however, the signaling overhead associated with reporting an interference level for every unscheduled REG 315 may be too high. As such, in such examples, the UE may instead report interference levels for a subset of the unscheduled REGs 315. For example, as illustrated in FIG. 3B, the control channel region 301 may include three PDCCH symbols 305 (e.g., a PDCCH symbol 305-d, a PDCCH symbol 305-c, a PDCCH symbol 305-f). The network entity may schedule one or more control channel transmissions for the UE, referred to as "UE-1," on one or more UE-1 REGs 320, and may schedule one or more control channel transmissions for a second UE, referred to as "UE-2," on one or more UE-2 REGs 325. Additionally, the network entity may configure one or more REGs of the control channel region 301, such as measurement REGs 330, as REGs dedicated for interference measurement by the UE-1 and the UE-2. Accordingly, the network entity may not schedule any control channel transmissions to any UEs via the measurement REGs 330. The network entity may indicate the measurement REGs 330 as part of the configuration. The remaining REGs of the control channel region 301 may be unscheduled REGs 335, which may be used for control channel transmissions to other UEs.

To determine PDCCH CSI for the CSF report, the UE-1 and the UE-2 may each perform channel estimation, energy detection, or both on each measurement REG 330. The UE-1 and the UE-2 may each determine, based on the channel estimation or energy detection, an interference level per measurement REG 330, and may indicate the interference level(s) to the network entity as part of respective CSF reports. The network entity may schedule and determine communication parameters for subsequent control channel transmissions to the UE-1 and the UE-2 based on receiving the CSF reports.

In a third CSF scheme, the measurement source may be one or more CSI-RSs (e.g., wideband CSI-RSs) transmitted by the network entity via one or more PDCCH symbols 305 of the control channel region 301. The one or more CSI-RSs may be dedicated for the derivation of PDCCH CSF. The network entity may rate-match the scheduled one or more control channel transmissions on the UE-1 REGs 320 around the one or more CSI-RSs. The UE-1 may receive and measure the one or more CSI-RSs and may perform channel estimation based on the measuring. Additionally, the UE-1 may estimate interference level(s) for the control channel region 301 based on the measuring. The UE-1 may use the channel estimation and the interference level(s) to test one or more candidate aggregation level hypotheses on the UE-1 REGs 320. In some cases, the one or more candidate aggregation level hypotheses may be from the set of candidate aggregation level hypotheses associated with the CSF indicated in the configuration.

The UE-1 may select a candidate aggregation level per UE-1 REG 320 or per group of UE-1 REGs 320, where the selected candidate aggregation level corresponds to a best PDCCH decoding performance (e.g., for a UE-1 REG 320) estimated by the one or more candidate aggregation level hypotheses. In the CSF report, the UE-1 may indicate the selected candidate aggregation level and the corresponding UE-1 REG 320. In some examples, the UE-1 may indicate, as part of the CSF report, a respective candidate aggregation level for each UE-1 REG 320. For instance, the UE-1 may indicate a first candidate aggregation level associated with the UE-1 REG 320-a, a second candidate aggregation level associated with the UE-1 REG 320-b, and a third candidate aggregation level associated with the UE-1 REG 320-c. Additionally, or alternatively, the UE may indicate the estimated interference level(s) (e.g., as SINR value(s)) for each UE-1 REG 320 or an estimated interference level for a group of UE-1 REGs 320. The network entity may determine communication parameters for subsequent control channel transmissions to the UE-1 based on the CSF report.

Figure 4:
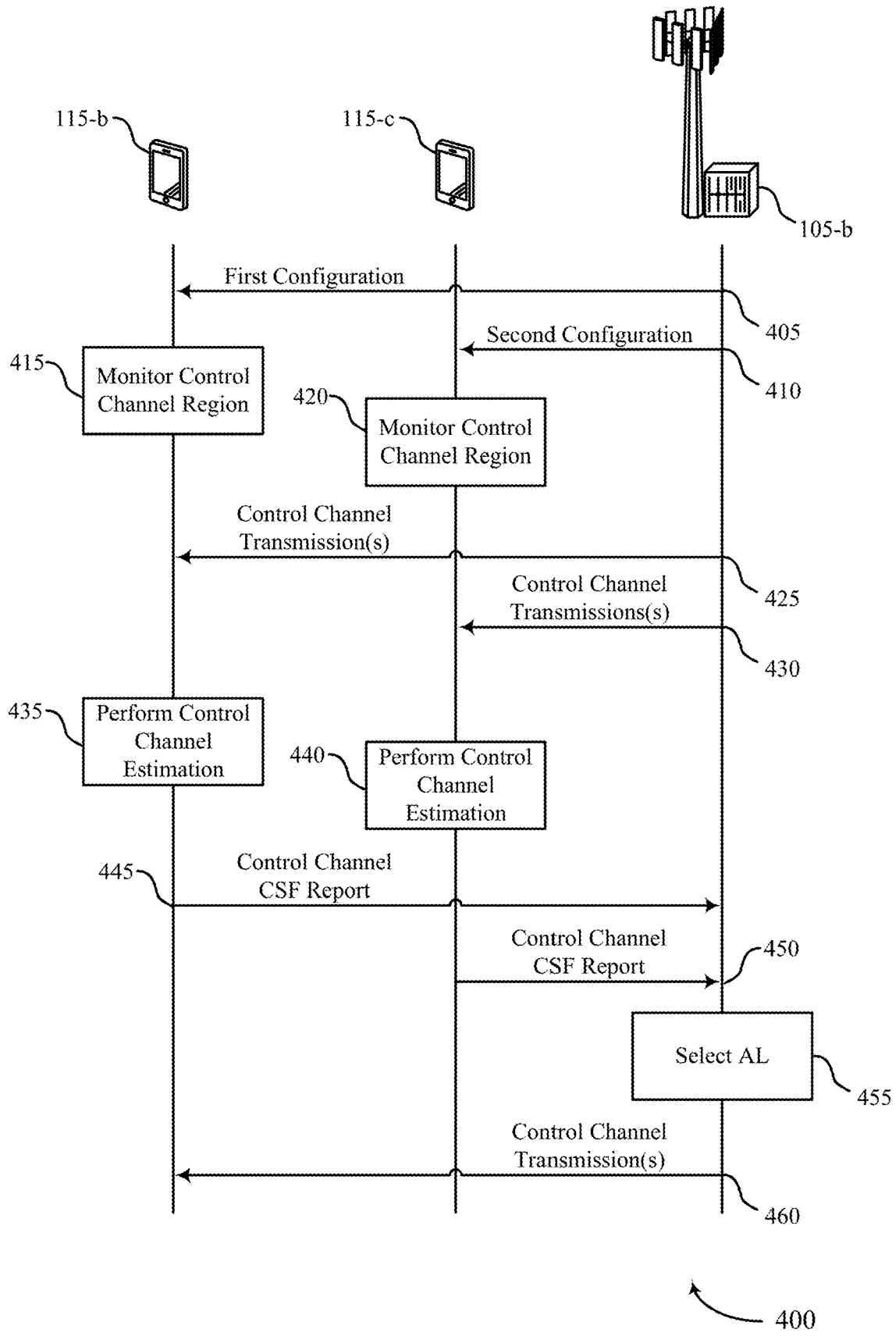
FIG. 4 shows an example of a process flow that supports CSF for control channels in accordance with one or more aspects of the present disclosure.

FIG. 4 shows an example of a process flow 400 that supports CSF for control channels in accordance with one or more aspects of the present disclosure. In some examples, process flow 400 may implement, or be implemented by, aspects of the wireless communications system 100, the wireless communications system 200, or both. In particular, the process flow 400 illustrates a control channel CSF procedure performed between a UE 115-b, a UE 115-c, and a network entity 105-b, which may be examples of the corresponding devices described herein. Alternative examples of the following may be implemented, where some steps are performed in a different order then described or are not performed at all. In some cases, steps may include additional features not mentioned below, or further steps may be added.

At 405, the network entity 105-b may transmit, and the UE 115-b may receive, a control message indicating a first configuration for reporting CSF for a first control channel region. The first configuration may indicate the first control region for which the UE 115-b is to transmit a CSF report. Additionally, the first configuration may indicate a first one or more resources for the UE 115-b to use to transmit the CSF report. In some examples, the first configuration may indicate a set of resources (e.g., REGs) of the first control channel region that are allocated for interference measurements, a set of resources of the first control channel region that are allocated for control channel CSI-RSs, or both. In some cases, the first configuration may indicate one or CSI parameters to be included in the CSF report, a set of one or more candidate aggregation level hypotheses associated with the CSF, a CSF scheme to be used for generating the CSF report, whether CSF reporting is enabled or disabled, or some combination thereof.

At 410, the network entity 105-b may transmit, and the UE 115-c may receive, a control message indicating a second configuration for reporting CSF for a second control channel region. The second configuration may indicate the second control region for which the UE 115-c is to transmit a CSF report. Additionally, the second configuration may indicate a second one or more resources for the UE 115-c to use to transmit the CSF report. In some examples, the second configuration may indicate a set of resources (e.g., REGs) of the second control channel region that are allocated for interference measurements, a set of resources of the second control channel region that are allocated for control channel CSI-RSs, or both. In some cases, the second configuration may indicate one or CSI parameters to be included in the CSF report, a set of one or more candidate aggregation level hypotheses associated with the CSF, a CSF scheme to be used for generating the CSF report, whether CSF reporting is enabled or disabled, or some combination thereof.

In some examples, the first control region may include a first set of one or more REGs scheduled for control channel transmissions to the UE 115-b. The second control region may include a second set of one or more REGs scheduled for control channel transmissions to the UE 115-c. The first control region and the second control region may be the same or may overlap (e.g., in time or frequency), such that the first control region and the second control region may be associated with the same set of resources allocated for interference measurements, the same set of resources allocated for control channel CSI-RSs, or both. In scenarios where the first control region and the second control region are the same or are overlapping, the first set of one or more REGs may be different than the second set of one or more REGs. Additionally, the first control region and the second control region may each include one or more empty REGs that are not scheduled with control channel transmissions.

At 415, the UE 115-*b* may monitor the first control channel region for a first one or more control channel transmissions according to the first configuration received at 405. For example, the UE 115-*b* may perform blind decoding and energy detection on the first control channel region to detect the first set of one or more REGs carrying the first one or more control channel transmissions.

At 420, the UE 115-*c* may monitor the second control channel region for a second one or more control channel transmissions according to the second configuration received at 410. For example, the UE 115-*c* may perform blind decoding and energy detection on the second control channel region to detect the second set of one or more REGs carrying the second one or more control channel transmissions.

At 425, the network entity 105-*b* may transmit, and the UE 115-*b* may receive based on the monitoring, the first one or more control channel transmissions via the first set of one or more REGs of the first control channel region. In some examples, the first one or more control channel transmissions may include or be associated with a first one or more DMRSs. In some examples, the first one or more control channel transmissions may be rate-matched around one or more control channel CSI-RSs. That is, the network entity 105-*b* may transmit, and the UE 115-*b* may receive, the one or more control channel CSI-RSs via the set of resources of the first control channel region that are allocated for the one or more control channel CSI-RSs.

At 430, the network entity 105-*b* may transmit, and the UE 115-*c* may receive based on the monitoring, the second one or more control channel transmissions via the second set of one or more REGs of the second control channel region. In some examples, the second one or more control channel transmissions may include or be associated with a second one or more DMRSs. In some examples, the second one or more control channel transmissions may be rate-matched around one or more control channel CSI-RSs. That is, the network entity 105-*b* may transmit, and the UE 115-*c* may receive, the one or more control channel CSI-RSs via the set of resources of the second control channel region that are allocated for the one or more control channel CSI-RSs.

At 435, the UE 115-*b* may perform control channel estimation to derive or otherwise determine CSF for the first control channel region, such as an interference level (e.g., an SINR), a candidate aggregation level, or the like. In some examples, the control channel estimation may include the UE 115-*b* performing one or more channel measurements on the first one or more DMRSs, the one or more control channel CSI-RSs, or both, and determining the CSF (e.g., a candidate aggregation level, an SINR) based on the one or more channel measurements. In some implementations, the control channel estimation may include the UE 115-*b* performing one or more measurements on the set of resources (e.g., REGs) allocated for interference measurements to determine an interference level (e.g., SINR) associated with the first control channel region. In some cases, the control channel estimation may be based on the blind decoding or energy detection performed at 415. For instance, the UE 115-*b* may perform control channel estimation by determining an interference level (e.g., SINR) associated with the one or more empty REGs in the first control channel region. In some examples, the control channel estimation may include the UE 115-*b* determining statistics associated with reception of control channel transmissions (e.g., previously-received control channel transmissions) via the first control channel region, such as a PDCCH decoding failure rate, one or more LLR statistics, or the like. The UE 115-*b* may perform the control channel estimation and determine the CSF (e.g., a candidate aggregation level, an SINR) based on the statistics.

At 440, the UE 115-*c* may perform control channel estimation to derive or otherwise determine CSF for the second control channel region, such as an interference level (e.g., an SINR), a candidate aggregation level, or the like. In some examples, the control channel estimation may include the UE 115-*c* performing one or more channel measurements on the second one or more DMRSs, the one or more control channel CSI-RSs, or both, and determining the CSF (e.g., a candidate aggregation level, an SINR) based on the one or more channel measurements. In some implementations, the control channel estimation may include the UE 115-*c* performing one or more measurements on the set of resources (e.g., REGs) allocated for interference measurements to determine an interference level (e.g., SINR) associated with the second control channel region. In some cases, the control channel estimation may be based on the blind decoding or energy detection performed at 420. For instance, the UE 115-*c* may perform control channel estimation by determining an interference level (e.g., SINR) associated with the one or more empty REGs in the second control channel region. In some examples, the control channel estimation may include the UE 115-*c* determining statistics associated with reception of control channel transmissions (e.g., previously-received control channel transmissions) via the second control channel region, such as a PDCCH decoding failure rate, one or more LLR statistics, or the like. The UE 115-*c* may perform the control channel estimation and determine the CSF (e.g., a candidate aggregation level, an SINR) based on the statistics.

At 445, the UE 115-*b* may transmit, and the network entity 105-*b* may receive, a first CSF report for the first control region via the first set of one or more resources in accordance with the first configuration. The first CSF report may indicate the CSF for the first control channel region based on the control channel estimation performed at 435 and in accordance with the first configuration. For example, the first CSF report may include a candidate aggregation level of a set of candidate aggregation levels, an SINR, or both, based on the statistics, the interference level based on the set of resources allocated for interference measurements, the interference level associated with the one or more empty REGs of the first control channel region, the one or more channel measurements of the one or more DMRSs, the one or more channel measurements of the one or more control channel CSI-RSs, or any combination thereof. In some cases, the CSF report may indicate a candidate aggregation level of a set of candidate aggregation levels, an SINR, or both, per REG of the first set of REGs or per REG group of the first set of REGs.

In some examples, the first CSF report may indicate the CSF for the first control channel region based on whether the one or more control channel transmissions received at 425 are unicast or broadcast. For example, the first CSF report may indicate a candidate aggregation level of a set of candidate aggregation levels associated with the one or more control channel transmissions based on the one or more control channel transmissions being unicast. Alternatively, the first CSF report may indicate an SINR associated with the one or more control channel transmissions based on the one or more control channel transmissions being broadcast.

At 450, the UE 115-*c* may transmit, and the network entity 105-*b* may receive, a second CSF report for the second control region via the second set of one or more resources in accordance with the second configuration. The second CSF report may indicate the CSF for the second control channel region based on the control channel estimation performed at 440 and in accordance with the second configuration. For example, the second CSF report may include a candidate aggregation level of a set of candidate aggregation levels, an SINR, or both, based on the statistics, the interference level associated with the set of resources allocated for interference measurements, the interference level associated with the one or more empty REGs of the second control channel region, the one or more channel measurements of the one or more DMRSs, the one or more channel measurements of the one or more control channel CSI-RSs, or any combination thereof. In some cases, the CSF report may indicate a candidate aggregation level of a set of candidate aggregation levels, an SINR, or both, per REG of the second set of REGs or per REG group of the second set of REGs.

In some examples, the second CSF report may indicate the CSF for the second control channel region based on whether the one or more control channel transmissions received at 430 are unicast or broadcast. For example, the second CSF report may indicate a candidate aggregation level of a set of candidate aggregation levels associated with the one or more control channel transmissions based on the one or more control channel transmissions being unicast. Alternatively, the second CSF report may indicate an SINR associated with the one or more control channel transmissions based on the one or more control channel transmissions being broadcast.

At 455, the network entity 105-*b* may select an aggregation level for subsequent control channel communications with the UE 115-*b* based on the first CSF report received at 435 and, in some cases, the second CSF report received at 440. For example, the network entity 105-*b* may select the aggregation level to be the same as the candidate aggregation level indicated by the UE 115-*b* in the first CSF report. In another example, the network entity 105-*b* may select the aggregation level based on the SINR indicated in the first CSF report and the SINR indicated in the second CSF report. For example, when the subsequent control channel communications are to be broadcast by the network entity 105-*b*, the network entity 105-*b* may combine the SINRs indicated in the CSF reports and may select an aggregation level that provides sufficient performance for both the UE 115-*b* and the UE 115-*c* based on the combined SINRs.

At 460, the network entity 105-*b* may transmit, and the UE 115-*b* may receive, a subsequent one or more control channel transmissions in accordance with the aggregation level selected at 455 and, in some cases, based on the first CSF report. For instance, the network entity 105-*b* may transmit, and the UE 115-*b* may receive, the subsequent one or more control channel transmissions based on the SINR indicated in the first CSF report. In some examples, the network entity 105-*b* may schedule the subsequent one or more control channel transmissions via one or more REGs of the first control region based on the first CSF report and, in some cases, the second CSF report. For example, the first CSF report may indicate a first interference level associated with a first REG of the first set of REGs and the second CSF report may indicate a second interference level associated with a second REG of the second set of REGs. The first interference level may be greater than the second interference level. To reduce interference associated with the subsequent one or more control channel transmissions, the network entity 105-*b* may transmit the subsequent one or more control channel transmissions via the second REG based on the first interference level being greater than the second interference level.

Figure 5:
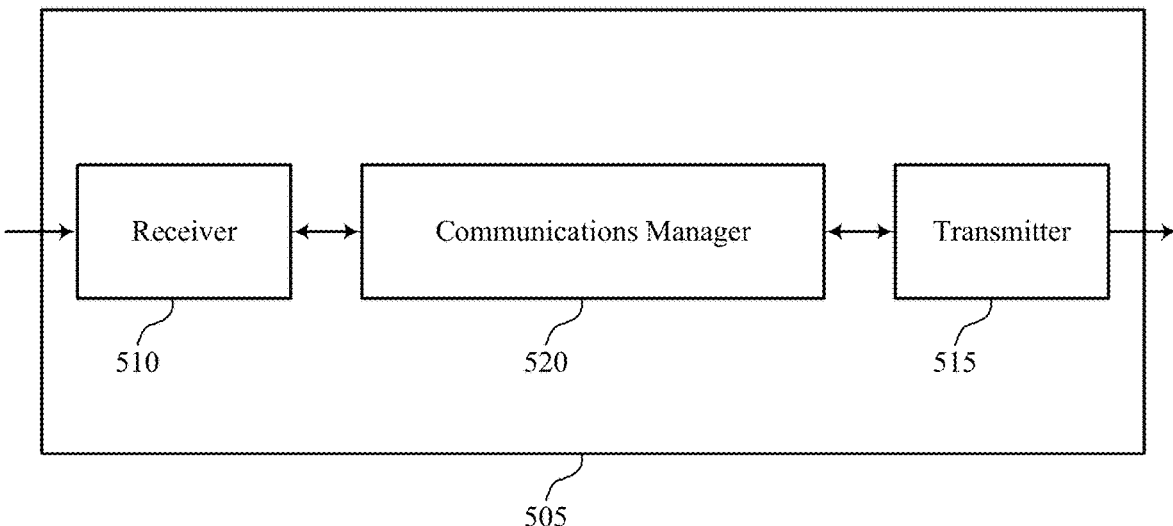
FIGS. 5 and 6 show block diagrams of devices that support CSF for control channels in accordance with one or more aspects of the present disclosure.

FIG. 5 shows a block diagram 500 of a device 505 that supports CSF for control channels in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to CSF for control channels). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to CSF for control channels). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of CSF for control channels as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor. If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication in accordance with examples as disclosed herein. For example, the communications manager 520 is capable of, configured to, or operable to support a means for receiving a control message indicating a configuration for reporting CSF for a control channel region, the configuration indicating the control channel region and one or more resources for transmitting a report indicating the CSF for the control channel region. The communications manager 520 is capable of, configured to, or operable to support a means for monitoring the control channel region for one or more control channel transmissions. The communications manager 520 is capable of, configured to, or operable to support a means for transmitting the report indicating the CSF for the control channel region via the one or more resources in accordance with the configuration and based on the monitoring.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for directly determining and reporting CSF for control channels, which may improve channel estimation accuracy as compared to control channel estimation techniques that are based on data channel estimates. Additionally, reporting CSF for control channels may enable the device 505 to receive subsequent control channel transmissions with improved reliability and efficiency and more efficient utilization of control channel resources.

Figure 6:
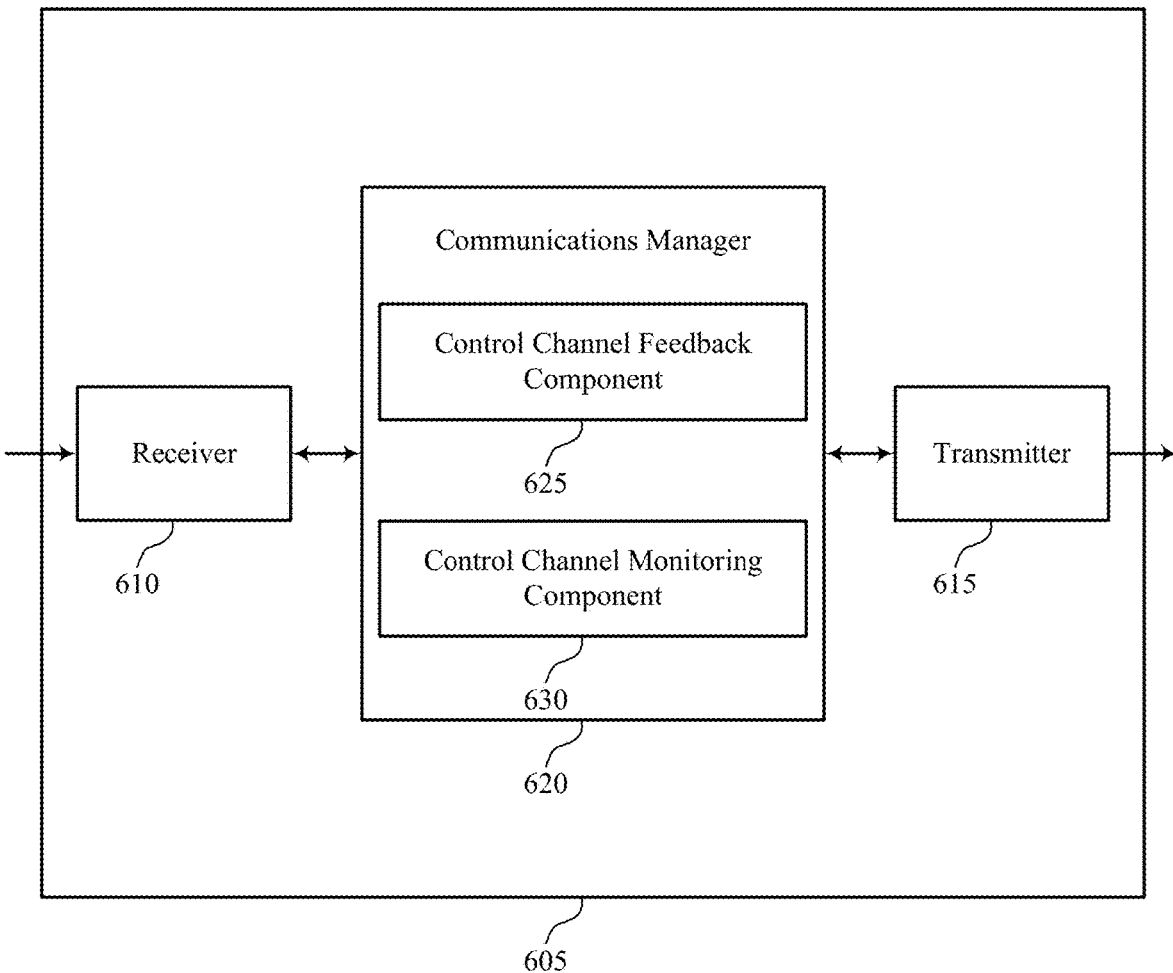

FIG. 6 shows a block diagram 600 of a device 605 that supports CSF for control channels in accordance with one or more aspects of the present disclosure. The device 605 may be an example of aspects of a device 505 or a UE 115 as described herein. The device 605 may include a receiver 610, a transmitter 615, and a communications manager 620. The device 605, or one of more components of the device 605 (e.g., the receiver 610, the transmitter 615, and the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to CSF for control channels). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to CSF for control channels). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of CSF for control channels as described herein. For example, the communications manager 620 may include a control channel feedback component 625 a control channel monitoring component 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication in accordance with examples as disclosed herein. The control channel feedback component 625 is capable of, configured to, or operable to support a means for receiving a control message indicating a configuration for reporting CSF for a control channel region, the configuration indicating the control channel region and one or more resources for transmitting a report indicating the CSF for the control channel region. The control channel monitoring component 630 is capable of, configured to, or operable to support a means for monitoring the control channel region for one or more control channel transmissions. The control channel feedback component 625 is capable of, configured to, or operable to support a means for transmitting the report indicating the CSF for the control channel region via the one or more resources in accordance with the configuration and based on the monitoring.

Figure 7:
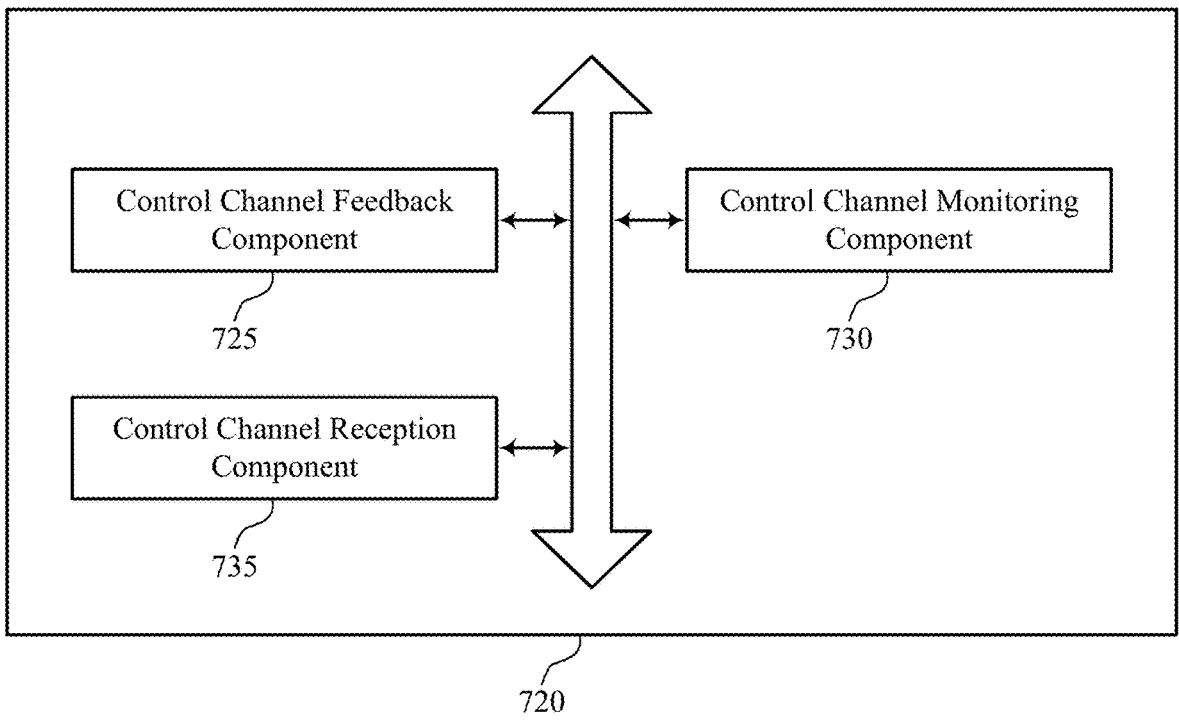
FIG. 7 shows a block diagram of a communications manager that supports CSF for control channels in accordance with one or more aspects of the present disclosure.

FIG. 7 shows a block diagram 700 of a communications manager 720 that supports CSF for control channels in accordance with one or more aspects of the present disclosure. The communications manager 720 may be an example of aspects of a communications manager 520, a communications manager 620, or both, as described herein. The communications manager 720, or various components thereof, may be an example of means for performing various aspects of CSF for control channels as described herein. For example, the communications manager 720 may include a control channel feedback component 725, a control channel monitoring component 730, a control channel reception component 735, or any combination thereof. Each of these components, or components or subcomponents thereof (e.g., one or more processors, one or more memories), may communicate, directly or indirectly, with one another (e.g., via one or more buses).

The communications manager 720 may support wireless communication in accordance with examples as disclosed herein. The control channel feedback component 725 is capable of, configured to, or operable to support a means for receiving a control message indicating a configuration for reporting CSF for a control channel region, the configuration indicating the control channel region and one or more resources for transmitting a report indicating the CSF for the control channel region. The control channel monitoring component 730 is capable of, configured to, or operable to support a means for monitoring the control channel region for one or more control channel transmissions. In some examples, the control channel feedback component 725 is capable of, configured to, or operable to support a means for transmitting the report indicating the CSF for the control channel region via the one or more resources in accordance with the configuration and based on the monitoring.

In some examples, the control channel reception component 735 is capable of, configured to, or operable to support a means for receiving the one or more control channel transmissions via the control channel region based on the monitoring, where the CSF is based on a measurement of one or more DMRSs associated with the one or more control channel transmissions.

In some examples, the report indicates a candidate aggregation level of a set of multiple candidate aggregation levels based on the measurement or indicates an SINR based on the measurement, and the control channel reception component 735 is capable of, configured to, or operable to support a means for receiving one or more subsequent control channel transmissions based on the candidate aggregation level or the SINR.

In some examples, the control channel reception component 735 is capable of, configured to, or operable to support a means for receiving the one or more control channel transmissions via the control channel region based on the monitoring, where the CSF is based on one or more statistics associated with reception of the one or more control channel transmissions via the control channel region.

In some examples, the report indicates a candidate aggregation level of a set of multiple candidate aggregation levels based on the one or more statistics or indicates an SINR based on the one or more statistics, and the control channel reception component 735 is capable of, configured to, or operable to support a means for receiving one or more subsequent control channel transmissions based on the candidate aggregation level or the SINR.

In some examples, the one or more statistics include one or more LLR statistics, a control channel decoding failure rate, or a combination thereof. In some examples, the control channel reception component 735 is capable of, configured to, or operable to support a means for receiving one or more subsequent control channel transmissions based on the report.

In some examples, the one or more control channel transmissions are received via a first set of one or more REGs of the control channel region, the first set of one or more REGs different from a second set of one or more REGs of the control channel region that are empty. In some examples, the CSF is based on the second set of one or more REGs. In some examples, the configuration further indicates the second set of one or more REGs.

In some examples, the configuration further indicates a set of one or more resources for receiving one or more CSI-RSs for the control channel region, and the control channel reception component 735 is capable of, configured to, or operable to support a means for receiving the one or more CSI-RSs via the set of one or more resources, where the CSF is based on a measurement of the one or more CSI-RSs.

In some examples, the report indicates a candidate aggregation level of a set of multiple candidate aggregation levels based on the measurement or indicates an SINR based on the measurement, and the control channel reception component 735 is capable of, configured to, or operable to support a means for receiving one or more subsequent control channel transmissions based on the candidate aggregation level or the SINR.

In some examples, the configuration further indicates one or more CSI parameters to be included in the report, a set of one or more candidate aggregation level hypotheses associated with the CSF, a CSF scheme to be used for generating the report, or a combination thereof.

In some examples, the report indicates a candidate aggregation level of a set of multiple candidate aggregation levels associated with the one or more control channel transmissions based on the one or more control channel transmissions being unicast. In some examples, the report indicates an SINR associated with the one or more control channel transmissions based on the one or more control channel transmissions being broadcast.

Figure 8:
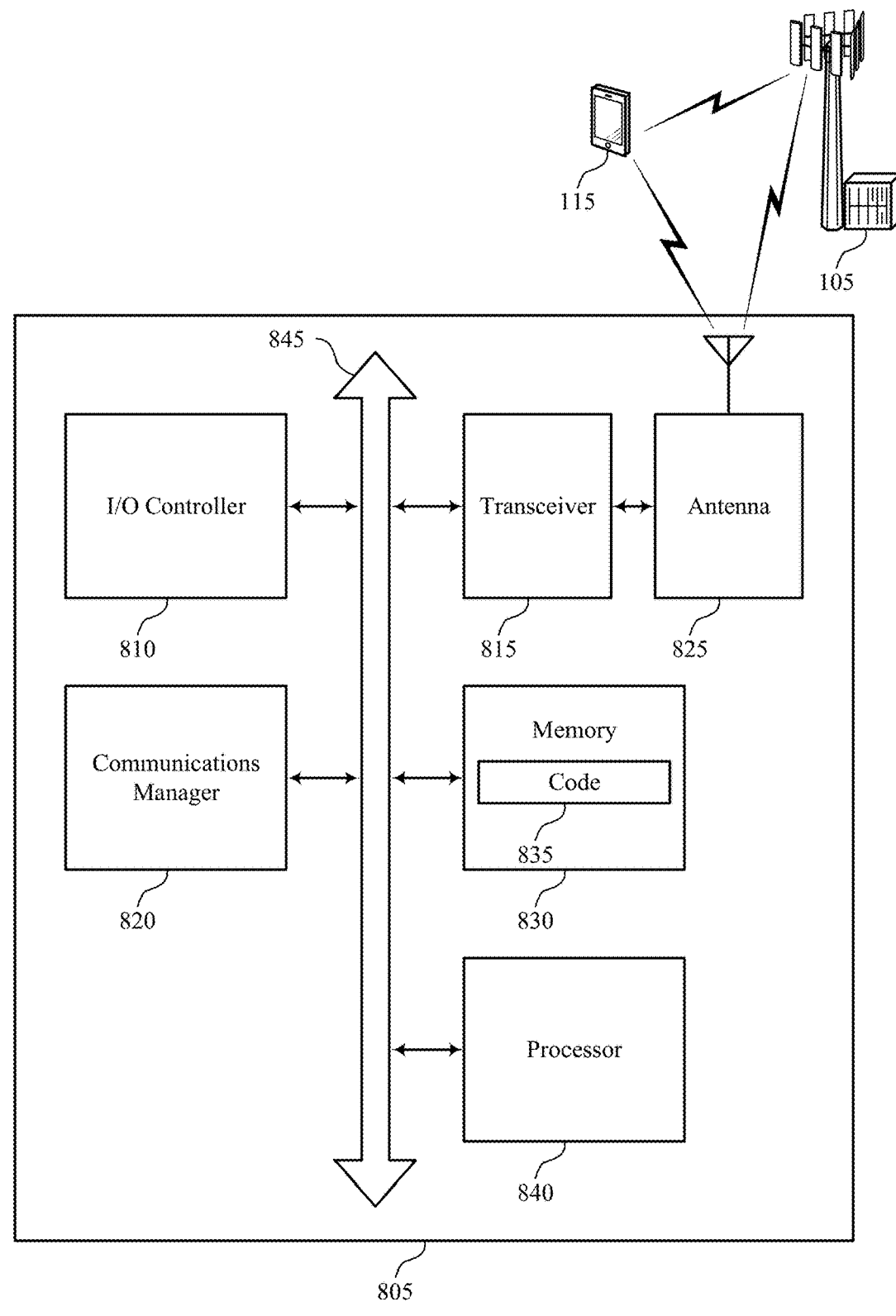
FIG. 8 shows a diagram of a system including a device that supports CSF for control channels in accordance with one or more aspects of the present disclosure.

FIG. 8 shows a diagram of a system 800 including a device 805 that supports CSF for control channels in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable code 835 including instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may contain, among other things, a basic I/O system (BIOS) which may control basic hardware or software operation such as the interaction with peripheral components or devices.

The at least one processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting CSF for control channels). For example, the device 805 or a component of the device 805 may include at least one processor 840 and at least one memory 830 coupled with or to the at least one processor 840, the at least one processor 840 and at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions herein. In some examples, the at least one processor 840 may be a component of a processing system, which may refer to a system (such as a series) of machines, circuitry (including, for example, one or both of processor circuitry (which may include the at least one processor 840) and memory circuitry (which may include the at least one memory 830)), or components, that receives or obtains inputs and processes the inputs to produce, generate, or obtain a set of outputs. The processing system may be configured to perform one or more of the functions described herein. As such, the at least one processor 840 or a processing system including the at least one processor 840 may be configured to, configurable to, or operable to cause the device 805 to perform one or more of the functions described herein. Further, as described herein, being "configured to," being "configurable to," and being "operable to" may be used interchangeably and may be associated with a capability, when executing code stored in the at least one memory 830 or otherwise, to perform one or more of the functions described herein.

The communications manager 820 may support wireless communication in accordance with examples as disclosed herein. For example, the communications manager 820 is capable of, configured to, or operable to support a means for receiving a control message indicating a configuration for reporting CSF for a control channel region, the configuration indicating the control channel region and one or more resources for transmitting a report indicating the CSF for the control channel region. The communications manager 820 is capable of, configured to, or operable to support a means for monitoring the control channel region for one or more control channel transmissions. The communications manager 820 is capable of, configured to, or operable to support a means for transmitting the report indicating the CSF for the control channel region via the one or more resources in accordance with the configuration and based on the monitoring.

By including or configuring the communications manager 820 in accordance with examples as described herein, the device 805 may support techniques for directly determining and reporting CSF for control channels, which may improve channel estimation accuracy as compared to control channel estimation techniques that are based on data channel estimates. Additionally, reporting CSF for control channels may enable the device 805 to receive subsequent control channel transmissions with improved reliability and efficiency.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of CSF for control channels as described herein, or the at least one processor 840 and the at least one memory 830 may be otherwise configured to, individually or collectively, perform or support such operations.

Figure 9:
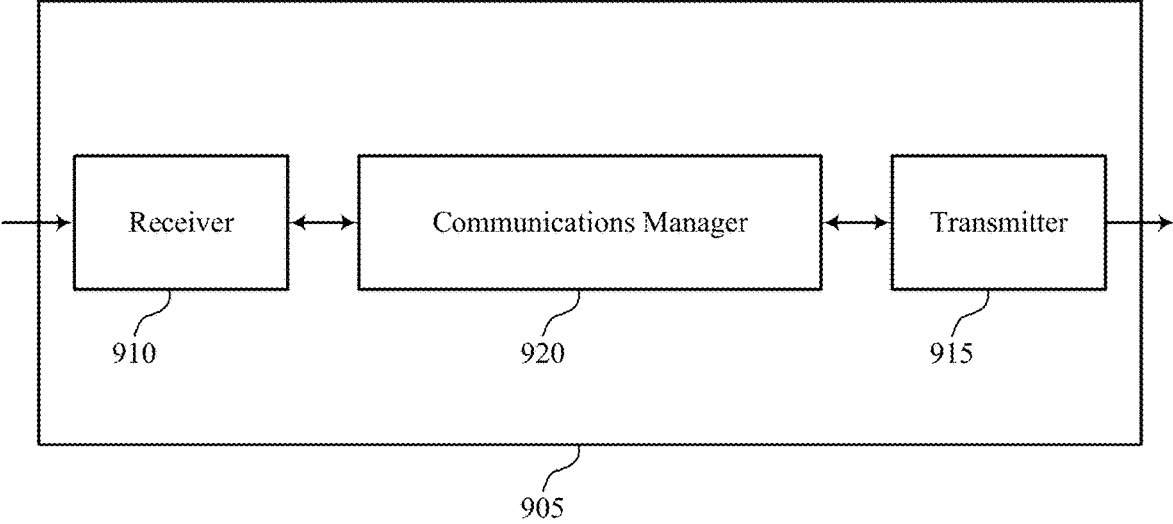
FIGS. 9 and 10 show block diagrams of devices that support CSF for control channels in accordance with one or more aspects of the present disclosure.

FIG. 9 shows a block diagram 900 of a device 905 that supports CSF for control channels in accordance with one or more aspects of the present disclosure. The device 905 may be an example of aspects of a network entity 105 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of CSF for control channels as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor. If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication in accordance with examples as disclosed herein. For example, the communications manager 920 is capable of, configured to, or operable to support a means for transmitting, to a UE, a control message indicating a configuration for reporting CSF for a control channel region, the configuration indicating the control channel region and one or more resources for a report indicating the CSF for the control channel region. The communications manager 920 is capable of, configured to, or operable to support a means for transmitting, via the control channel region, one or more control channel transmissions. The communications manager 920 is capable of, configured to, or operable to support a means for receiving, from the UE, the report indicating the CSF for the control channel region via the one or more resources in accordance with the configuration.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for receiving explicit CSF feedback for control channels, which may improve channel estimation accuracy as compared to control channel estimation techniques that are based on data channel estimates. Additionally, the device 905 may determine parameters for subsequent control channel transmissions based on the CSF feedback, which may enable more efficient utilization of control channel resources.

Figure 10:
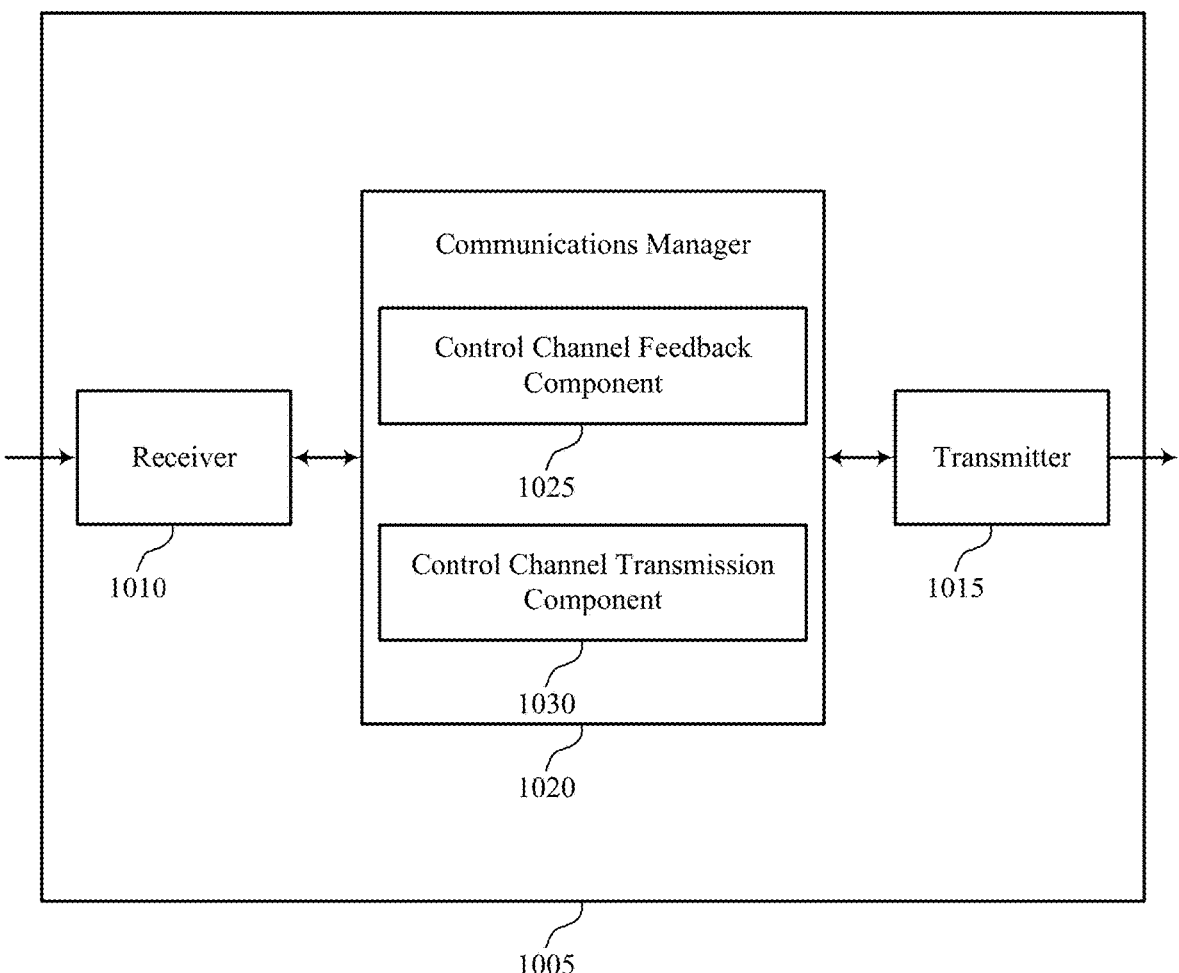

FIG. 10 shows a block diagram 1000 of a device 1005 that supports CSF for control channels in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005, or one of more components of the device 1005 (e.g., the receiver 1010, the transmitter 1015, and the communications manager 1020), may include at least one processor, which may be coupled with at least one memory, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of CSF for control channels as described herein. For example, the communications manager 1020 may include a control channel feedback component 1025 a control channel transmission component 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication in accordance with examples as disclosed herein. The control channel feedback component 1025 is capable of, configured to, or operable to support a means for transmitting, to a UE, a control message indicating a configuration for reporting CSF for a control channel region, the configuration indicating the control channel region and one or more resources for a report indicating the CSF for the control channel region. The control channel transmission component 1030 is capable of, configured to, or operable to support a means for transmitting, via the control channel region, one or more control channel transmissions. The control channel feedback component 1025 is capable of, configured to, or operable to support a means for receiving, from the UE, the report indicating the CSF for the control channel region via the one or more resources in accordance with the configuration.

Figure 11:
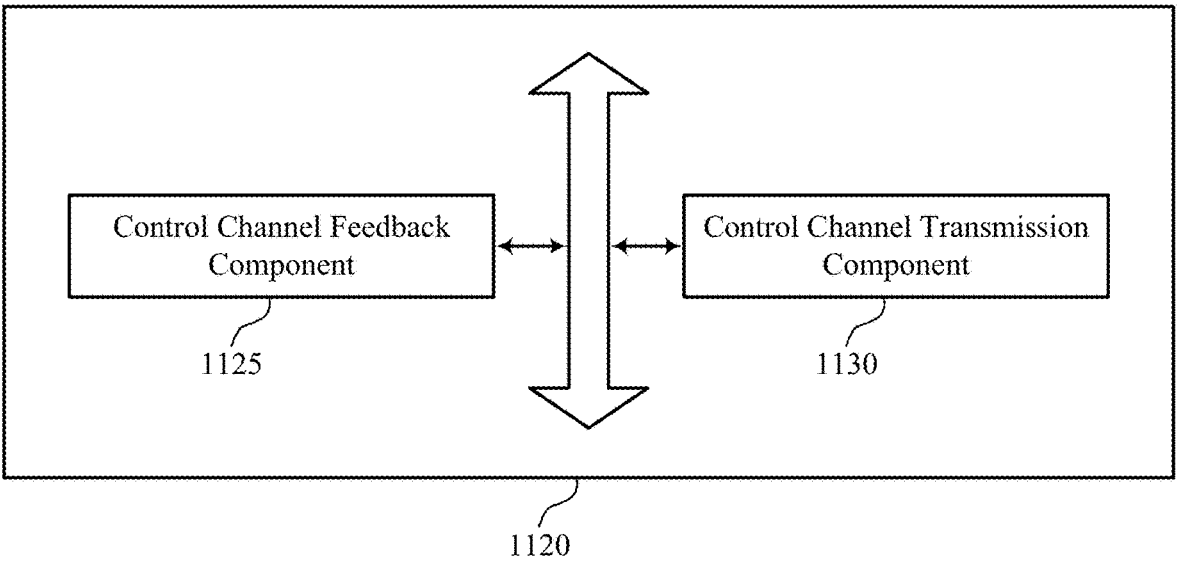
FIG. 11 shows a block diagram of a communications manager that supports CSF for control channels in accordance with one or more aspects of the present disclosure.

FIG. 11 shows a block diagram 1100 of a communications manager 1120 that supports CSF for control channels in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of CSF for control channels as described herein. For example, the communications manager 1120 may include a control channel feedback component 1125 a control channel transmission component 1130, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication in accordance with examples as disclosed herein. The control channel feedback component 1125 is capable of, configured to, or operable to support a means for transmitting, to a UE, a control message indicating a configuration for reporting CSF for a control channel region, the configuration indicating the control channel region and one or more resources for a report indicating the CSF for the control channel region. The control channel transmission component 1130 is capable of, configured to, or operable to support a means for transmitting, via the control channel region, one or more control channel transmissions. In some examples, the control channel feedback component 1125 is capable of, configured to, or operable to support a means for receiving, from the UE, the report indicating the CSF for the control channel region via the one or more resources in accordance with the configuration.

In some examples, the CSF is based on a measurement of one or more DMRSs associated with the one or more control channel transmissions.

In some examples, the report indicates a candidate aggregation level of a set of multiple candidate aggregation levels based on the measurement or indicates an SINR based on the measurement, and the control channel transmission component 1130 is capable of, configured to, or operable to support a means for transmitting one or more subsequent control channel transmissions based on the candidate aggregation level or the SINR.

In some examples, the CSF is based on one or more statistics associated with reception, by the UE, of the one or more control channel transmissions via the control channel region.

In some examples, the report indicates a candidate aggregation level of a set of multiple candidate aggregation levels based on the one or more statistics or indicates an SINR based on the one or more statistics, and the control channel transmission component 1130 is capable of, configured to, or operable to support a means for transmitting one or more subsequent control channel transmissions based on the candidate aggregation level or the SINR.

In some examples, the one or more statistics include one or more LLR statistics, a control channel decoding failure rate, or a combination thereof.

In some examples, the control channel transmission component 1130 is capable of, configured to, or operable to support a means for transmitting one or more subsequent control channel transmissions based on the report.

In some examples, the one or more subsequent control channel transmissions are transmitted in accordance with an aggregation level that is selected based on a set of multiple reports including the report, the set of multiple reports from a set of multiple UEs including the UE.

In some examples, the control channel transmission component 1130 is capable of, configured to, or operable to support a means for transmitting, to a second UE, a second one or more control channel transmissions via the control channel region. In some examples, the control channel feedback component 1125 is capable of, configured to, or operable to support a means for receiving, from the second UE, a second report indicating a second CSF for the control channel region.

In some examples, the one or more control channel transmissions are transmitted via a first REG of the control channel region and the second one or more control channel transmissions are transmitted via a second REG of the control channel region, and the control channel transmission component 1130 is capable of, configured to, or operable to support a means for transmitting a third one or more control channel transmissions via the second REG based on the first REG being associated with a first interference level that is greater than a second interference level associated with the second REG, where the report indicates the first interference level and the second report indicates the second interference level.

In some examples, the one or more control channel transmissions are transmitted via a first set of one or more REGs of the control channel region, the first set of one or more REGs different from a second set of one or more REGs of the control channel region that are empty. In some examples, the CSF is based on the second set of one or more REGs.

In some examples, the configuration further indicates the second set of one or more REGs.

In some examples, the configuration further indicates a set of one or more resources for transmitting one or more CSI-RSs for the control channel region, and the control channel transmission component 1130 is capable of, configured to, or operable to support a means for transmitting the one or more CSI-RSs via the set of one or more resources, where the CSF is based on a measurement of the one or more CSI-RSs.

In some examples, the report indicates a candidate aggregation level of a set of multiple candidate aggregation levels based on the measurement or indicates an SINR based on the measurement, and the control channel transmission component 1130 is capable of, configured to, or operable to support a means for transmitting one or more subsequent control channel transmissions based on the candidate aggregation level or the SINR.

In some examples, the one or more control channel transmissions are rate-matched around the one or more CSI-RSs.

In some examples, the configuration further indicates one or more CSI parameters to be included in the report, a set of one or more candidate aggregation level hypotheses associated with the CSF, a CSF scheme to be used for generating the report, or a combination thereof.

In some examples, the report indicates a candidate aggregation level of a set of multiple candidate aggregation levels associated with the one or more control channel transmissions based on the one or more control channel transmissions being unicast.

In some examples, the report indicates an SINR associated with the one or more control channel transmissions based on the one or more control channel transmissions being broadcast.

Figure 12:
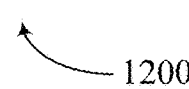
FIG. 12 shows a diagram of a system including a device that supports CSF for control channels in accordance with one or more aspects of the present disclosure.

FIG. 12 shows a diagram of a system 1200 including a device 1205 that supports CSF for control channels in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some examples, the transceiver 1210 may be operable to support communications via one or more communications links (e.g., a communication link 125, a backhaul communication link 120, a midhaul communication link 162, a fronthaul communication link 168).

The at least one memory 1225 may include RAM, ROM, or any combination thereof. The at least one memory 1225 may store computer-readable, computer-executable code 1230 including instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may contain, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting CSF for control channels). For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225). In some examples, the at least one processor 1235 may include multiple processors and the at least one memory 1225 may include multiple memories. One or more of the multiple processors may be coupled with one or more of the multiple memories, which may, individually or collectively, be configured to perform various functions herein. In some examples, the at least one processor 1235 may be a component of a processing system, which may refer to a system (such as a series) of machines, circuitry (including, for example, one or both of processor circuitry (which may include the at least one processor 1235) and memory circuitry (which may include the at least one memory 1225)), or components, that receives or obtains inputs and processes the inputs to produce, generate, or obtain a set of outputs. The processing system may be configured to perform one or more of the functions described herein. As such, the at least one processor 1235 or a processing system including the at least one processor 1235 may be configured to, configurable to, or operable to cause the device 1205 to perform one or more of the functions described herein. Further, as described herein, being "configured to," being "configurable to," and being "operable to" may be used interchangeably and may be associated with a capability, when executing code stored in the at least one memory 1225 or otherwise, to perform one or more of the functions described herein.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some examples, the communications manager 1220 may manage aspects of communications with a core network 130 (e.g., via one or more wired or wireless backhaul links).

For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication in accordance with examples as disclosed herein. For example, the communications manager 1220 is capable of, configured to, or operable to support a means for transmitting, to a UE, a control message indicating a configuration for reporting CSF for a control channel region, the configuration indicating the control channel region and one or more resources for a report indicating the CSF for the control channel region. The communications manager 1220 is capable of, configured to, or operable to support a means for transmitting, via the control channel region, one or more control channel transmissions. The communications manager 1220 is capable of, configured to, or operable to support a means for receiving, from the UE, the report indicating the CSF for the control channel region via the one or more resources in accordance with the configuration.

By including or configuring the communications manager 1220 in accordance with examples as described herein, the device 1205 may support techniques for receiving explicit CSF feedback for control channels, which may improve channel estimation accuracy as compared to control channel estimation techniques that are based on data channel estimates. Additionally, the device 1205 may determine parameters for subsequent control channel transmissions based on the CSF feedback, thereby improving communication reliability and efficiency.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of CSF for control channels as described herein, or the at least one processor 1235 and the at least one memory 1225 may be otherwise configured to, individually or collectively, perform or support such operations.

FIG. 13 shows a flowchart illustrating a method 1300 that supports CSF for control channels in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving a control message indicating a configuration for reporting CSF for a control channel region, the configuration indicating the control channel region and one or more resources for transmitting a report indicating the CSF for the control channel region. The operations of block 1305 may be performed in accordance with examples as disclosed herein. In some examples, aspects of the operations of 1305 may be performed by a control channel feedback component 725 as described with reference to FIG. 7.

At 1310, the method may include monitoring the control channel region for one or more control channel transmissions. The operations of block 1310 may be performed in accordance with examples as disclosed herein. In some examples, aspects of the operations of 1310 may be performed by a control channel monitoring component 730 as described with reference to FIG. 7.

At 1315, the method may include transmitting the report indicating the CSF for the control channel region via the one or more resources in accordance with the configuration and based on the monitoring. The operations of block 1315 may be performed in accordance with examples as disclosed herein. In some examples, aspects of the operations of 1315 may be performed by a control channel feedback component 725 as described with reference to FIG. 7.

FIG. 14 shows a flowchart illustrating a method 1400 that supports CSF for control channels in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving a control message indicating a configuration for reporting CSF for a control channel region, the configuration indicating the control channel region and one or more resources for transmitting a report indicating the CSF for the control channel region. The operations of block 1405 may be performed in accordance with examples as disclosed herein. In some examples, aspects of the operations of 1405 may be performed by a control channel feedback component 725 as described with reference to FIG. 7.

At 1410, the method may include monitoring the control channel region for one or more control channel transmissions. The operations of block 1410 may be performed in accordance with examples as disclosed herein. In some examples, aspects of the operations of 1410 may be performed by a control channel monitoring component 730 as described with reference to FIG. 7.

At 1415, the method may include receiving the one or more control channel transmissions via the control channel region based on the monitoring. The operations of block 1415 may be performed in accordance with examples as disclosed herein. In some examples, aspects of the operations of 1415 may be performed by a control channel reception component 735 as described with reference to FIG. 7.

At 1420, the method may include transmitting the report indicating the CSF for the control channel region via the one or more resources in accordance with the configuration and based on the monitoring, where the CSF is based on a measurement of one or more DMRSs associated with the one or more control channel transmissions, and where the report indicates a candidate aggregation level of a plurality of candidate aggregation levels or an SINR based on the measurement. The operations of block 1420 may be performed in accordance with examples as disclosed herein. In some examples, aspects of the operations of 1420 may be performed by a control channel feedback component 725 as described with reference to FIG. 7.

At 1425, the method may include receiving one or more subsequent control channel transmissions based on the candidate aggregation level or the SINR. The operations of block 1425 may be performed in accordance with examples as disclosed herein. In some examples, aspects of the operations of 1425 may be performed by a control channel reception component 735 as described with reference to FIG. 7.

FIG. 15 shows a flowchart illustrating a method 1500 that supports CSF for control channels in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include receiving a control message indicating a configuration for reporting CSF for a control channel region, the configuration indicating the control channel region, one or more resources for transmitting a report indicating the CSF for the control channel region, and a set of one or more resources for receiving one or more CSI-RSs for the control channel region. The operations of block 1505 may be performed in accordance with examples as disclosed herein. In some examples, aspects of the operations of 1505 may be performed by a control channel feedback component 725 as described with reference to FIG. 7.

At 1510, the method may include monitoring the control channel region for one or more control channel transmissions. The operations of block 1510 may be performed in accordance with examples as disclosed herein. In some examples, aspects of the operations of 1510 may be performed by a control channel monitoring component 730 as described with reference to FIG. 7.

At 1515, the method may include receiving the one or more CSI-RSs via the set of one or more resources. The operations of block 1515 may be performed in accordance with examples as disclosed herein. In some examples, aspects of the operations of 1515 may be performed by a control channel reception component 735 as described with reference to FIG. 7.

At 1520, the method may include transmitting the report indicating the CSF for the control channel region via the one or more resources in accordance with the configuration and based on the monitoring, where the CSF is based on a measurement of the one or more CSI-RSs, and where the report indicates a candidate aggregation level of a plurality of candidate aggregation levels or an SINR based on the measurement. The operations of block 1520 may be performed in accordance with examples as disclosed herein. In some examples, aspects of the operations of 1520 may be performed by a control channel feedback component 725 as described with reference to FIG. 7.

At 1525, the method may include receiving one or more subsequent control channel transmissions based on the candidate aggregation level or the SINR. The operations of block 1525 may be performed in accordance with examples as disclosed herein. In some examples, aspects of the operations of 1525 may be performed by a control channel reception component 735 as described with reference to FIG. 7.

FIG. 16 shows a flowchart illustrating a method 1600 that supports CSF for control channels in accordance with aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include transmitting, to a UE, a control message indicating a configuration for reporting CSF for a control channel region, the configuration indicating the control channel region and one or more resources for a report indicating the CSF for the control channel region. The operations of block 1605 may be performed in accordance with examples as disclosed herein. In some examples, aspects of the operations of 1605 may be performed by a control channel feedback component 1125 as described with reference to FIG. 11.

At 1610, the method may include transmitting, via the control channel region, one or more control channel transmissions. The operations of block 1610 may be performed in accordance with examples as disclosed herein. In some examples, aspects of the operations of 1610 may be performed by a control channel transmission component 1130 as described with reference to FIG. 11.

At 1615, the method may include receiving, from the UE, the report indicating the CSF for the control channel region via the one or more resources in accordance with the configuration. The operations of block 1615 may be performed in accordance with examples as disclosed herein. In some examples, aspects of the operations of 1615 may be performed by a control channel feedback component 1125 as described with reference to FIG. 11.

FIG. 17 shows a flowchart illustrating a method 1700 that supports CSF for control channels in accordance with aspects of the present disclosure. The operations of the method 1700 may be implemented by a network entity or its components as described herein. For example, the operations of the method 1700 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1705, the method may include transmitting, to a UE, a control message indicating a configuration for reporting CSF for a control channel region, the configuration indicating the control channel region and one or more resources for a report indicating the CSF for the control channel region. The operations of block 1705 may be performed in accordance with examples as disclosed herein. In some examples, aspects of the operations of 1705 may be performed by a control channel feedback component 1125 as described with reference to FIG. 11.

At 1710, the method may include transmitting, to the UE, one or more control channel transmissions via a first REG of the control channel region. The operations of block 1710 may be performed in accordance with examples as disclosed herein. In some examples, aspects of the operations of 1710 may be performed by a control channel transmission component 1130 as described with reference to FIG. 11.

At 1715, the method may include receiving, from the UE, the report indicating the CSF for the control channel region via the one or more resources in accordance with the configuration. The operations of block 1715 may be performed in accordance with examples as disclosed herein. In some examples, aspects of the operations of 1715 may be performed by a control channel feedback component 1125 as described with reference to FIG. 11.

At 1720, the method may include transmitting, to a second UE, a second one or more control channel transmissions via a second REG of the control channel region. The operations of block 1720 may be performed in accordance with examples as disclosed herein. In some examples, aspects of the operations of 1720 may be performed by a control channel transmission component 1130 as described with reference to FIG. 11.

At 1725, the method may include receiving, from the second UE, a second report indicating a second CSF for the control channel region. The operations of block 1725 may be performed in accordance with examples as disclosed herein. In some examples, aspects of the operations of 1725 may be performed by a control channel feedback component 1125 as described with reference to FIG. 11.

At 1730, the method may include transmitting a third one or more control channel transmissions via the second REG based on the first REG being associated with a first interference level that is greater than a second interference level associated with the second REG, where the report indicates the first interference level and the second report indicates the second interference level. The operations of block 1730 may be performed in accordance with examples as disclosed herein. In some examples, aspects of the operations of 1730 may be performed by a control channel transmission component 1130 as described with reference to FIG. 11.

The following provides an overview of aspects of the present disclosure:

Aspect 1: A method for wireless communication by a UE, comprising: receiving a control message indicating a configuration for reporting CSF for a control channel region, the configuration indicating the control channel region and one or more resources for transmitting a report indicating the CSF for the control channel region; monitoring the control channel region for one or more control channel transmissions; and transmitting the report indicating the CSF for the control channel region via the one or more resources in accordance with the configuration and based at least in part on the monitoring.

Aspect 2: The method of aspect 1, further comprising: receiving the one or more control channel transmissions via the control channel region based at least in part on the monitoring, wherein the CSF is based at least in part on a measurement of one or more DMRSs associated with the one or more control channel transmissions.

Aspect 3: The method of aspect 2, wherein the report indicates a candidate aggregation level of a plurality of candidate aggregation levels based at least in part on the measurement or indicates a SINR based at least in part on the measurement, the method further comprising: receiving one or more subsequent control channel transmissions based at least in part on the candidate aggregation level or the SINR.

Aspect 4: The method of any of aspects 1 through 3, further comprising: receiving the one or more control channel transmissions via the control channel region based at least in part on the monitoring, wherein the CSF is based at least in part on one or more statistics associated with reception of the one or more control channel transmissions via the control channel region.

Aspect 5: The method of aspect 4, wherein the report indicates a candidate aggregation level of a plurality of candidate aggregation levels based at least in part on the one or more statistics or indicates a SINR based at least in part on the one or more statistics, the method further comprising: receiving one or more subsequent control channel transmissions based at least in part on the candidate aggregation level or the SINR.

Aspect 6: The method of any of aspects 4 through 5, wherein the one or more statistics comprise one or more LLR statistics, a control channel decoding failure rate, or a combination thereof.

Aspect 7: The method of any of aspects 1 through 6, further comprising: receiving one or more subsequent control channel transmissions based at least in part on the report.

Aspect 8: The method of any of aspects 1 through 7, further comprising: receiving the one or more control channel transmissions via a first set of one or more REGs of the control channel region, the first set of one or more REGs different from a second set of one or more REGs of the control channel region that are empty, and the CSF is based at least in part on the second set of one or more REGs.

Aspect 9: The method of aspect 8, wherein the configuration further indicates the second set of one or more REGs.

Aspect 10: The method of any of aspects 1 through 9, wherein the configuration further indicates a set of one or more resources for receiving one or more CSI-RSs for the control channel region, the method further comprising: receiving the one or more CSI-RSs via the set of one or more resources, wherein the CSF is based at least in part on a measurement of the one or more CSI-RSs.

Aspect 11: The method of aspect 10, wherein the report indicates a candidate aggregation level of a plurality of candidate aggregation levels based at least in part on the measurement or indicates a SINR based at least in part on the measurement, the method further comprising: receiving one or more subsequent control channel transmissions based at least in part on the candidate aggregation level or the SINR.

Aspect 12: The method of any of aspects 1 through 11, wherein the configuration further indicates one or more CSI parameters to be included in the report, a set of one or more candidate aggregation level hypotheses associated with the CSF, a CSF scheme to be used for generating the report, or a combination thereof.

Aspect 13: The method of any of aspects 1 through 12, wherein the report indicates a candidate aggregation level of a plurality of candidate aggregation levels associated with the one or more control channel transmissions based at least in part on the one or more control channel transmissions being unicast.

Aspect 14: The method of any of aspects 1 through 13, wherein the report indicates a SINR associated with the one or more control channel transmissions based at least in part on the one or more control channel transmissions being broadcast.

Aspect 15: A method for wireless communication by a network entity, comprising: transmitting, to a UE, a control message indicating a configuration for reporting CSF for a control channel region, the configuration indicating the control channel region and one or more resources for a report indicating the CSF for the control channel region; transmitting, via the control channel region, one or more control channel transmissions; and receiving, from the UE, the report indicating the CSF for the control channel region via the one or more resources in accordance with the configuration.

Aspect 16: The method of aspect 15, wherein the CSF is based at least in part on a measurement of one or more DMRSs associated with the one or more control channel transmissions.

Aspect 17: The method of aspect 16, wherein the report indicates a candidate aggregation level of a plurality of candidate aggregation levels based at least in part on the measurement or indicates a SINR based at least in part on the measurement, the method further comprising: transmitting one or more subsequent control channel transmissions based at least in part on the candidate aggregation level or the SINR.

Aspect 18: The method of any of aspects 15 through 17, wherein the CSF is based at least in part on one or more statistics associated with reception, by the UE, of the one or more control channel transmissions via the control channel region.

Aspect 19: The method of aspect 18, wherein the report indicates a candidate aggregation level of a plurality of candidate aggregation levels based at least in part on the one or more statistics or indicates a SINR based at least in part on the one or more statistics, the method further comprising: transmitting one or more subsequent control channel transmissions based at least in part on the candidate aggregation level or based at least in part on the SINR.

Aspect 20: The method of any of aspects 18 through 19, wherein the one or more statistics comprise one or more LLR statistics, a control channel decoding failure rate, or a combination thereof.

Aspect 21: The method of any of aspects 15 through 20, further comprising: transmitting one or more subsequent control channel transmissions based at least in part on the report.

Aspect 22: The method of aspect 21, further comprising: transmitting the one or more subsequent control channel transmissions in accordance with an aggregation level that is selected based at least in part on a plurality of reports including the report, the plurality of reports from a plurality of UEs including the UE.

Aspect 23: The method of any of aspects 15 through 22, further comprising: transmitting, to a second UE, a second one or more control channel transmissions via the control channel region; and receiving, from the second UE, a second report indicating a second CSF for the control channel region.

Aspect 24: The method of aspect 23, wherein the one or more control channel transmissions are transmitted via a first REG of the control channel region and the second one or more control channel transmissions are transmitted via a second REG of the control channel region, the method further comprising: transmitting a third one or more control channel transmissions via the second REG based at least in part on the first REG being associated with a first interference level that is greater than a second interference level associated with the second REG, wherein the report indicates the first interference level and the second report indicates the second interference level.

Aspect 25: The method of any of aspects 15 through 24, wherein the one or more control channel transmissions are transmitted via a first set of one or more REGs of the control channel region, the first set of one or more REGs different from a second set of one or more REGs of the control channel region that are empty, and the CSF is based at least in part on the second set of one or more REGs.

Aspect 26: The method of aspect 25, wherein the configuration further indicates the second set of one or more REGs.

Aspect 27: The method of any of aspects 15 through 26, wherein the configuration further indicates a set of one or more resources for transmitting one or more CSI-RSs for the control channel region, the method further comprising: transmitting the one or more CSI-RSs via the set of one or more resources, wherein the CSF is based at least in part on a measurement of the one or more CSI-RSs.

Aspect 28: The method of aspect 27, wherein the report indicates a candidate aggregation level of a plurality of candidate aggregation levels based at least in part on the measurement or indicates a SINR based at least in part on the measurement, the method further comprising: transmitting one or more subsequent control channel transmissions based at least in part on the candidate aggregation level or based at least in part on the SINR.

Aspect 29: The method of any of aspects 27 through 28, wherein the one or more control channel transmissions are rate-matched around the one or more CSI-RSs.

Aspect 30: The method of any of aspects 15 through 29, wherein the configuration further indicates one or more CSI parameters to be included in the report, a set of one or more candidate aggregation level hypotheses associated with the CSF, a CSF scheme to be used for generating the report, or a combination thereof.

Aspect 31: The method of any of aspects 15 through 30, wherein the report indicates a candidate aggregation level of a plurality of candidate aggregation levels associated with the one or more control channel transmissions based at least in part on the one or more control channel transmissions being unicast.

Aspect 32: The method of any of aspects 15 through 31, wherein the report indicates a SINR associated with the one or more control channel transmissions based at least in part on the one or more control channel transmissions being broadcast.

Aspect 33: A UE for wireless communication, comprising one or more memories storing processor-executable code, and one or more processors coupled with the one or more memories and individually or collectively operable to execute the code to cause the UE to perform a method of any of aspects 1 through 14.

Aspect 34: A UE for wireless communication, comprising at least one means for performing a method of any of aspects 1 through 14.

Aspect 35: A non-transitory computer-readable medium storing code for wireless communication, the code comprising instructions executable by one or more processors to perform a method of any of aspects 1 through 14.

Aspect 36: A network entity for wireless communication, comprising one or more memories storing processor-executable code, and one or more processors coupled with the one or more memories and individually or collectively operable to execute the code to cause the network entity to perform a method of any of aspects 15 through 32.

Aspect 37: A network entity for wireless communication, comprising at least one means for performing a method of any of aspects 15 through 32.

Aspect 38: A non-transitory computer-readable medium storing code for wireless communication, the code comprising instructions executable by one or more processors to perform a method of any of aspects 15 through 32.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
one or more memories storing processor-executable code; and
one or more processors coupled with the one or more memories and individually or collectively operable to execute the code to cause the UE to:
receive a control message indicating a configuration for reporting channel state feedback (CSF) for a control channel region, the configuration indicating the control channel region and one or more resources for transmitting a report indicating the CSF for the control channel region;
monitor the control channel region for one or more control channel transmissions; and
transmit the report indicating the CSF for the control channel region via the one or more resources in accordance with the configuration and based at least in part on the control channel region being monitored.

2. The UE of claim 1, wherein the one or more processors are individually or collectively further operable to execute the code to cause the UE to:

receive the one or more control channel transmissions via the control channel region based at least in part on the control channel region being monitored, wherein the CSF is based at least in part on a measurement of one or more demodulation reference signals (DMRSs) associated with the one or more control channel transmissions.

3. The UE of claim 2, wherein the report indicates a candidate aggregation level of a plurality of candidate aggregation levels based at least in part on the measurement or indicates a signal-to-interference-plus-noise ratio (SINR) based at least in part on the measurement, and the one or more processors are individually or collectively further operable to execute the code to cause the UE to:

receive one or more subsequent control channel transmissions based at least in part on the candidate aggregation level or the SINR.

4. The UE of claim 1, wherein the one or more processors are individually or collectively further operable to execute the code to cause the UE to:

receive the one or more control channel transmissions via the control channel region based at least in part on the control channel region being monitored, wherein the CSF is based at least in part on one or more statistics associated with reception of the one or more control channel transmissions via the control channel region.

5. The UE of claim 4, wherein the report indicates a candidate aggregation level of a plurality of candidate aggregation levels based at least in part on the one or more statistics or indicates a signal-to-interference-plus-noise ratio (SINR) based at least in part on the one or more statistics, and the one or more processors are individually or collectively further operable to execute the code to cause the UE to:

receive one or more subsequent control channel transmissions based at least in part on the candidate aggregation level or the SINR.

6. The UE of claim 4, wherein the one or more statistics comprise one or more log-likelihood ratio (LLR) statistics, a control channel decoding failure rate, or a combination thereof.

7. The UE of claim 1, wherein the one or more processors are individually or collectively further operable to execute the code to cause the UE to:

receive one or more subsequent control channel transmissions based at least in part on the report.

8. The UE of claim 1, wherein the one or more processors are individually or collectively further operable to execute the code to cause the UE to:

receive the one or more control channel transmissions, based at least in part on the control channel region being monitored, via a first set of one or more resource element groups (REGs) of the control channel region, the first set of one or more REGs different from a second set of one or more REGs of the control channel region that are empty, and the CSF is based at least in part on the second set of one or more REGs.

9. The UE of claim 8, wherein the configuration further indicates the second set of one or more REGs.

10. The UE of claim 1, wherein the configuration further indicates a set of one or more resources for receiving one or more channel state information (CSI) reference signals (CSI-RSs) for the control channel region, and the one or more processors are individually or collectively further operable to execute the code to cause the UE to:

receive the one or more CSI-RSs via the set of one or more resources, wherein the CSF is based at least in part on a measurement of the one or more CSI-RSs.

11. The UE of claim 10, wherein the report indicates a candidate aggregation level of a plurality of candidate aggregation levels based at least in part on the measurement or indicates a signal-to-interference-plus-noise ratio (SINR) based at least in part on the measurement, and the one or more processors are individually or collectively further operable to execute the code to cause the UE to:

receive one or more subsequent control channel transmissions based at least in part on the candidate aggregation level or the SINR.

12. The UE of claim 1, wherein the configuration further indicates one or more channel state information (CSI) parameters to be included in the report, a set of one or more candidate aggregation level hypotheses associated with the CSF, a CSF scheme to be used for the report being generated, or a combination thereof.

13. The UE of claim 1, wherein the report indicates a candidate aggregation level of a plurality of candidate aggregation levels associated with the one or more control channel transmissions based at least in part on the one or more control channel transmissions being unicast.

14. The UE of claim 1, wherein the report indicates a signal-to-interference-plus-noise ratio (SINR) associated with the one or more control channel transmissions based at least in part on the one or more control channel transmissions being broadcast.

15. A network entity, comprising:

one or more memories storing processor-executable code; and one or more processors coupled with the one or more memories and individually or collectively operable to execute the code to cause the network entity to:

transmit, to a user equipment (UE), a control message indicating a configuration for reporting channel state feedback (CSF) for a control channel region, the configuration indicating the control channel region and one or more resources for a report indicating the CSF for the control channel region;

transmit, via the control channel region, one or more control channel transmissions; and receive, from the UE, the report indicating the CSF for the control channel region via the one or more resources in accordance with the configuration and based at least in part on the one or more control channel transmissions.

16. The network entity of claim 15, wherein the CSF is based at least in part on a measurement of one or more demodulation reference signals (DMRSs) associated with the one or more control channel transmissions.

17. The network entity of claim 16, wherein the report indicates a candidate aggregation level of a plurality of candidate aggregation levels based at least in part on the measurement or indicates a signal-to-interference-plus-noise ratio (SINR) based at least in part on the measurement, and the one or more processors are individually or collectively further operable to execute the code to cause the network entity to:

transmit one or more subsequent control channel transmissions based at least in part on the candidate aggregation level or the SINR.

18. The network entity of claim 15, wherein the CSF is based at least in part on one or more statistics associated with reception, by the UE, of the one or more control channel transmissions via the control channel region.

19. The network entity of claim 18, wherein the report indicates a candidate aggregation level of a plurality of candidate aggregation levels based at least in part on the one or more statistics or indicates a signal-to-interference-plus-noise ratio (SINR) based at least in part on the one or more statistics, and the one or more processors are individually or collectively further operable to execute the code to cause the network entity to:

transmit one or more subsequent control channel transmissions based at least in part on the candidate aggregation level or based at least in part on the SINR.

20. The network entity of claim 18, wherein the one or more statistics comprise one or more log-likelihood ratio (LLR) statistics, a control channel decoding failure rate, or a combination thereof.

21. The network entity of claim 15, wherein the one or more processors are individually or collectively further operable to execute the code to cause the network entity to:

transmit one or more subsequent control channel transmissions based at least in part on the report.

22. The network entity of claim 21, wherein the one or more processors are individually or collectively further operable to execute the code to cause the network entity to:

transmit the one or more subsequent control channel transmissions in accordance with an aggregation level that is selected based at least in part on a plurality of reports including the report, the plurality of reports from a plurality of UEs including the UE.

23. The network entity of claim 15, wherein the one or more processors are individually or collectively further operable to execute the code to cause the network entity to:

transmit, to a second UE, a second one or more control channel transmissions via the control channel region; and receive, from the second UE, a second report indicating a second CSF for the control channel region.

24. The network entity of claim 23, wherein the one or more control channel transmissions are transmitted via a first resource element group (REG) of the control channel region and the second one or more control channel transmissions are transmitted via a second REG of the control channel region, and the one or more processors are individually or collectively further operable to execute the code to cause the network entity to:

transmit a third one or more control channel transmissions via the second REG based at least in part on the first REG being associated with a first interference level that is greater than a second interference level associated with the second REG, wherein the report indicates the first interference level and the second report indicates the second interference level.

25. The network entity of claim 15, wherein:

the one or more control channel transmissions are transmitted via a first set of one or more resource element groups (REGs) of the control channel region, the first set of one or more REGs different from a second set of one or more REGs of the control channel region that are empty, and the CSF is based at least in part on the second set of one or more REGs.

26. The network entity of claim 25, wherein the configuration further indicates the second set of one or more REGs.

27. The network entity of claim 15, wherein the configuration further indicates a set of one or more resources for transmitting one or more channel state information (CSI) reference signals (CSI-RSs) for the control channel region, and the one or more processors are individually or collectively further operable to execute the code to cause the network entity to:

transmit the one or more CSI-RSs via the set of one or more resources, wherein the CSF is based at least in part on a measurement of the one or more CSI-RSs.

28. The network entity of claim 27, wherein the report indicates a candidate aggregation level of a plurality of candidate aggregation levels based at least in part on the measurement or indicates a signal-to-interference-plus-noise ratio (SINR) based at least in part on the measurement, and the one or more processors are individually or collectively further operable to execute the code to cause the network entity to:

transmit one or more subsequent control channel transmissions based at least in part on the candidate aggregation level or based at least in part on the SINR.

29. A method for wireless communication by a user equipment (UE), comprising:

receiving a control message indicating a configuration for reporting channel state feedback (CSF) for a control channel region, the configuration indicating the control channel region and one or more resources for transmitting a report indicating the CSF for the control channel region;

monitoring the control channel region for one or more control channel transmissions; and transmitting the report indicating the CSF for the control channel region via the one or more resources in accordance with the configuration and based at least in part on the monitoring.

30. A method for wireless communication by a network entity, comprising:

transmitting, to a user equipment (UE), a control message indicating a configuration for reporting channel state feedback (CSF) for a control channel region, the configuration indicating the control channel region and one or more resources for a report indicating the CSF for the control channel region;

transmitting, via the control channel region, one or more control channel transmissions; and receiving, from the UE, the report indicating the CSF for the control channel region via the one or more resources in accordance with the configuration and based at least in part on the one or more control channel transmissions.

* * * * *